(12) United States Patent
Bajpai et al.

(10) Patent No.: US 7,276,226 B2
(45) Date of Patent: Oct. 2, 2007

(54) CHROMIUM DIOXIDE (CRO$_2$) AND COMPOSITES OF CHROMIUM DIOXIDE AND OTHER OXIDES OF CHROMIUM SUCH AS CRO$_2$/CR$_2$O$_3$ AND CRO$_2$/CR$_2$O$_5$) AND PROCESS FOR MANUFACTURING THE SAME

(75) Inventors: Ashna Bajpai, Mumbai (IN); Arun Kumar Nigam, Mumbai (IN)

(73) Assignee: Tata Institute of Fundamental Research, Mumbai (IN)

( * ) Notice: Subject to any disclaimer, the term of this patent is extended or adjusted under 35 U.S.C. 154(b) by 199 days.

(21) Appl. No.: 10/525,939

(22) PCT Filed: Aug. 22, 2003

(86) PCT No.: PCT/IN03/00278

§ 371 (c)(1),
(2), (4) Date: Feb. 28, 2005

(87) PCT Pub. No.: WO2004/020338

PCT Pub. Date: Mar. 11, 2004

(65) Prior Publication Data

US 2005/0271577 A1 Dec. 8, 2005

(30) Foreign Application Priority Data

Aug. 29, 2002 (IN) .................................. 783/02

(51) Int. Cl.
*C01G 37/00* (2006.01)
*H01F 1/00* (2006.01)

(52) U.S. Cl. .................. 423/607; 423/53; 252/62.51 C

(58) Field of Classification Search ................... 423/53, 423/607; 252/62.51 C
See application file for complete search history.

(56) References Cited

U.S. PATENT DOCUMENTS 3,117,093 A * 1/1964 Arthur, Jr. et al. .... 252/62.51 C
3,449,073 A * 6/1969 Balthis, Jr. ............... 423/594.1
3,979,310 A * 9/1976 Montiglio et al. .... 252/62.51 C
4,092,439 A * 5/1978 Demazeau et al. ......... 423/607
4,126,714 A * 11/1978 Haines ....................... 427/127
4,428,852 A * 1/1984 Covington et al. ...... 252/62.56
5,378,383 A * 1/1995 Jachow et al. ........... 252/62.56

FOREIGN PATENT DOCUMENTS

GB 1274880 A * 5/1972

OTHER PUBLICATIONS

The English abstract of GB 1,343,622 A published Jan. 16, 1974.*
P. G. Ivanov et al. "Epitaxial growth of CrO2 thin films by chemical-vapor deposition from a Cr8O21 precursor" Journal of Applied Physics, vol. 89, No. 2 (Jan. 15, 2001), pp. 1035-1040.*
L. Ranno et al. "Production and magnetotransport properties of CrO2 films" Journal of Applied Physics, vol. 81, (8) (Apr. 15, 1997), pp. 5774-5776.*
J. Dai et al. "Junction-like magnetoresistance of intergranular tunneling in field-aligned chromium dioxide powders" Physical Review B, vol. 63 (2001) pp. 054434-1 to 054434-4.*

* cited by examiner

*Primary Examiner*—Timothy C. Vanoy
(74) *Attorney, Agent, or Firm*—Akerman Senterfitt; Stephen A. Pendorf

(57) ABSTRACT

A novel process for preparing chromium dioxide of substantially high purity as well as composites of $CrO_2/Cr_2O_3$ and $CrO_2/Cr_2O_5$ following a sequence of simple steps. The process does not require pressure as a control parameter during the process of synthesis. No chemical modifier has been used to bring down the working pressure during synthesis. Fairly hard sintered pellets of $CrO_2$ can be obtained without introducing any detectable impurity phase that usually appears during the process of sintering. Further, $CrO_2/Cr_2O_3$ and $CrO_2/Cr_2O_5$ composites have also been prepared where the fraction of insulating $Cr_2O_3$ or $Cr_2O_5$ in metallic $CrO_2$ can be easily controlled. Significant negative magnetoresistance is found in pure $CrO_2$ (5% MR) as well as $CrO_2/Cr_2O_3$ (33% MR) composites near room temperature. The MR studies on the $CrO_2/Cr_2O_5$ composites have been done and significant negative MR (22%) has been found in $CrO_2/Cr_2O_5$ composites near room temperature.

46 Claims, 19 Drawing Sheets

CHROMIUM DIOXIDE ($CRO_2$) AND COMPOSITES OF CHROMIUM DIOXIDE AND OTHER OXIDES OF CHROMIUM SUCH AS $CRO_2/CR_2O_3$ AND $CRO_2/CR_2O_5$) AND PROCESS FOR MANUFACTURING THE SAME

CROSS REFERENCE TO RELATED APPLICATION

This application is a national stage of PCT/IN2003/000278 filed Aug. 22, 2003 and based upon IN 783/MUM/2002 filed Aug. 29, 2002 under the International Convention.

BACKGROUND OF THE INVENTION

1. Field of the Invention

The present invention relates to half metallic ferromagnetic chromium dioxide ($CrO_2$) in substantially pure form. The present invention further relates to composites of chromium dioxide and other oxides of chromium namely, $CrO_2/Cr_2O_3$ and $CrO_2/Cr_2O_5$. The present invention further relates to a process for manufacturing said substantially pure chromium dioxide and composites of chromium dioxide and other oxides. Chromium dioxide is a well known material used in magnetic recording applications. Apart from this, $CrO_2$ and the composites of $CrO_2$ with other oxides of chromium have wide application as a magnetoresistive and spintronic material.

2. Related Art of the Invention

Pure CrO2: Chromium dioxide ($CrO_2$) is a metallic, room temperature ferromagnet with Curie temperature ($T_c$) around 393 K. It has been widely used as a particulate media in magnetic recording applications since long. B. L Chamberland has reviewed in 1977 "The chemical and physical properties of $CrO_2$ and tetravalent chromium oxide derivatives" in *CRC Critical Rev. in Solid State and Mater. Sci.* 7, 1 (1977).

$CrO_2$ is also well known to be a half metallic ferromagnet. Half metallic ferromagnets are defined as ferromagnets in which conduction electrons are fully spin polarized at low temperatures where spin disorder is minimum (see "New class of materials: half metallic ferromagnets" R. A. Groot et. al, Phy. Rev. Lett 50, 2024, 1983). It is desirable to maintain the spin polarization near room temperatures so that devices based on spin polarised current could be realized. The phenomenon of spin polarized conduction has given rise to an upcoming field of spintronics wherein devices are based on spin polarized current. In 2001, Ji et. al, have observed, through Andreev reflection measurements, the maximum spin polarization close to 100% in $CrO_2$, vis a vis other materials showing half metallicity. See "Determination of the spin polarization of half metallic $CrO_2$ by point contact Andreev reflection", *Phy. Rev. Lett.*, Y. ji et. al., 86, 5585, 2001.

Polycrstalline $CrO_2$ is now well established to be a magnetoresistive and spintronic material. Here the magnetoresistance (MR) is defined as $\Delta R/R_o=(R_H-R_o)/R_o$, where $R_o$ and $R_H$ are the electrical resistance in zero field and in external magnetic field (H), respectively. Materials displaying negative MR greater that a few percent are used in various devices. Related prior art can be seen in U.S. Pat. No. 5,856,008.

Interestingly, $CrO_2$ is known to show the metallic conductivity in single crystals and epitaxially grown thin films. However, activated behavior is seen in polycrystalline $CrO_2$ that is believed to be arising from hopping/tunneling of the charge carrier across grain boundaries in polycrystals. This mechanism of 'spin polarized tunneling' of charge carriers across the grain boundaries which exist in polycrystalline samples were first proposed by Hwang et. al in their paper entitled "Spin polarized intergrain tunneling in $La_{2/3}Sr_{1/3}MnO_3$, Phys. Rev. Lett. 77, 2041 (1996). J M D Coey et. al, have related this mechanism of conduction to the origin of large magnetoresistance exhibited by polycrystalline $CrO_2$ in their paper entitled "Magnetoresistance of Chromium dioxide powder compacts, *Phy. Rev. Lett.* 80, 3815, 1998". One area in which half metallic ferromagnets have tremendous device application is Magnetic Tunnel Junctions. (Warren E Picket and Jagdeesh S Moodera, "Half-metallic Magnets" *Physics Today*, May 2001). The half-metallic ferromagnets, as a magnetoresistive material have been employed in various magneto-electronic applications.

The utility of above-mentioned devices is significant when substantial MR is found near room temperatures. In case of polycrystalline $CrO_2$, it is found that MR is maximum at lowest temperatures of the order of 5K and is known to decrease rapidly with increasing temperatures. For instance Coey et. al have reported MR of the order of 0.1% near room temperature in their paper entitled "Magnetoresistance of Chromium dioxide powder compacts, *Phy. Rev. Lett.* 80, 3815, 1998". There are several factors that may cause the loss of spin polarization. The presence of even a small amount of impurity phase not only affects the ferromagnetic properties but also interferes with the phenomenon of half metallicity/spin polarization severely. This results in the loss of spin polarization and thus brings down the efficiency of the concerned device, based on spin-polarized current.

Since $CrO_2$ is a material of industrial importance, there have been a large number of patents and papers on various preparation methods and intricacies involved for preparing $CrO_2$. The related prior art is presented in Table 1. There are three important factors related to synthesis of $CrO_2$ (i) Taking $CrO_3$ as starting material, $CrO_2$ is not known to form in ambient pressure. (ii) Pressure temperature phase diagram is highly interlinked resulting in mixed phase compounds. (iii) It is known that once formed, sintering of $CrO_2$ is difficult since it is a metastable phase and easily converts to $Cr_2O_3$ even at modest temperatures of 200° C. (See L. Ranno, A. Barry and J. M. D. Coey, J. Appl. Phys., 81, 5774 (1997)). This is an important issue related with the fabrication and reproducibility factor of devices based on $CrO_2$.

TABLE 1

| U.S. Pat. No. | Starting Material | Temp. Pressure | Product | Remarks |
|---|---|---|---|---|
| 2923685 (1960) | $CrO_3$, $H_2O$, $Na_2SO_4$ | 450° C., 1000 Atm | $CrO_2$ | * |
| 3423320 (1969) | $KCr_3O_8$, $H_2O$, | 2600 Atm | $CrO_2$ | needle like FM |
| 3449073 (1969) | $CrO_3$, $Cr_2O_3$, $Na_2Cr_2O_7$ | 850 Atm | $CrO_2$ | fine grain particles |

TABLE 1-continued

| U.S. Pat. No. | Starting Material | Temp. Pressure | Product | Remarks |
|---|---|---|---|---|
| 4428852 (1984) | preheated hydrated Chromium oxide | elevated pressure/ continuous process | $CrO_2$ | * |
| 3117093 (1964) | $Cr_xO_y$ 2y/x is 4–5.5 | 50–3000 Atm | $CrO_2$ | * |
| 3493338 (1970)) | $CrO_3$, NO, $O_2$ | 225, 325° C. no pressure | $CrO_2$ 94% + $CrO_3$, 5% | * |
| 5856008 (1999) | $CrO_3$ | 520° C. 35000 bar | $CrO_2$ $CrO_2$ coated with $Cr_2O_3$ | * ** |

*Relevant to production of $CrO_2$;
**relevant to production of $CrO_2/Cr_2O_3$ Composite.

Table 1 shows that (a) $CrO_3$ (chromium VI oxide) has been used as a starting material. $CrO_2$ can be prepared by thermal decomposition of $CrO_3$ and mixed chromium oxides.

(b) There exist a very narrow window of temperature and pressure in which many other oxides of chromium stabilize, including $CrO_2$, and the phase boundary between these oxides is very fuzzy. Consequently a little variation in preparation condition results in mixed phase or impure compounds Chamberland has discussed this aspect by showing it in FIGS. 1 and 2 on page 3 of his review (ibid.).

(c) The difficulties of accurately measuring and controlling pressure at elevated temperatures, along with the fact that it requires expensive high-pressure assemblies leading to high production cost are the main drawbacks of above-mentioned preparative methods. It is desirable to have a preparative method, which does not need pressure as controlling parameter.

(d) The last three U.S. patents in the above table form relevant prior art to the present invention and will be discussed after describing the present invention in detail.

A ferromagnetic sample is characterized by its saturation magnetization $M_s$ at 0 K and Curie temperature $T_c$. The theoretical value for saturation magnetization for $CrO_2$ is about 135 emu/gm. The best-reported value for the saturation magnetization for polycrystalline samples range from 75-87 emu/gm as reported in earlier patents (Table 2). The single crystals have shown value of the order of 108 emu/gm. The best values of Ms for polycrystalline $CrO_2$ supplied by DuPont is from 87-110 emu/g as given in "Spin phonon coupling in rod shaped half metallic $CrO_2$ ultra fine particles: a magnetic Raman scattering study, T Yu et al., J. Phys. Condens. Matter 15, L213, 2003 and "Junction like magnetoresistance of intergranular tunneling in field aligned chromium dioxide powders", Jianbiai Dai and Jinke Tang, Phy. Rev. B, 63, 054434 (2001).

Since the saturation magnetization value ($M_s$) is an important criterion for a pure ferromagnetic material, and is a test for comparing various processes, some $M_s$ values from literature for $CrO_2$ are given in Table 2.

TABLE 2

Saturation Magnetization Values for $CrO_2$ as reported in literature

| Reference | Saturation Magnetization ($M_s$) (emu/gm) |
|---|---|
| Theoretical Value of $M_s$ | ~135* |
| U.S. Pat. No. 4747974 (polycrystalline) | 75–78 |

TABLE 2-continued

Saturation Magnetization Values for $CrO_2$ as reported in literature

| Reference | Saturation Magnetization ($M_s$) (emu/gm) |
|---|---|
| U.S. Pat. No. 3493338 (polycrystal) | 24–84 (including modifier) |
| U.S. Pat. No. 3486851 (polycrystal) | 78–87 |
| U.S. Pat. No. 3451771 (polycrystal) | 21–35 |
| U.S. Pat. No. 2923683 (polycrystal) | 38–66 (with modifier) |
| Poly crystal Chamberland (1977) | 73–75 |
| Single crystal (Chamberland 1977) | 108 |
| Polycrystals supplied by DuPont | ~100–110 emu/g |

*Note: For calculating the theoretical value of $M_s$, density of the $CrO_2$ is taken as 4.8 g/cm³ However the density calculated from X-Ray measurements is found to be 4.89 g/cm³ whereas observed density is of the order of 4.8 g/cm³. This point is discussed in the review article on $CrO_2$ by Chamberland, Page 10

Composites of $CrO_2$ and $Cr_2O_3$: An important aspect related with $CrO_2/Cr_2O_3$ composites is that it is also a magnetoresistive material. The most important aspect of composites of chromium dioxide and chromium sesquioxide ($CrO_2/Cr_2O_3$) is that they show an enhancement of magnetoresistance ratio over pure polycrystalline chromium dioxide at low temperatures. It is known that the percentage magnetoresistance is increased when insulating $Cr_2O_3$ is added to metallic $CrO_2$. However, composites having high magnetoresistance near room temperature have not been reported which is more significant from the device application point of view. Moreover, the known composites are in the cold pressed form due to the reason that $CrO_2$ once formed, is known to be a metastable phase which degrades at temperatures as moderate as 200° C. Due to this reason neither pure $CrO_2$ nor its composites can be sintered to make hard pellets for practical usage. Hard pellets are made by putting chemical binder etc. This difficulty exists for bulk transport measurements for which sintered forms of the composite is desirable.

Composites prepared by known methods lack homogeneity as well as reproducibility factor which is important for all practical purposes of using composites as a magnetoresistive material in device applications. Generally a $CrO_2/Cr_2O_3$ composite may be obtained by (i) annealing pure $CrO_2$ in oxygen at elevated temperatures preferable in the range 350 to 500 C (U.S. Pat. No. 5,856,008) (ii) mixing of pure $CrO_2$ in pure $Cr_2O_3$ to obtain a composite in desirable ratio (See J M D Coey et al Phy. Rev. Lett. 80, 3815, 1998).

Both annealing process and mixing process have their own disadvantage. For instance as taught in U.S. Pat. No. 5,856,008, annealing of $CrO_2$ above a certain temperature results in $Cr_2O_3$ layer of thickness that inhibit intergrain tunneling and therefore reduce the magnetoresistance. This puts the upper limit on the mass fraction of $Cr_2O_3$ in $CrO_2$. Since it is known that the % MR can be tuned depending on the mass fraction of $Cr_2O_3$ in $CrO_2$, it is desirable to have a process through which mass fraction of $Cr_2O_3$ can be easily controlled. Similarly a composite obtained by mixing $CrO_2$ and $Cr_2O_3$ in desired ratio cannot be obtained in sintered form, besides the final MR value depends on the grain size and porosity of the sample, which may vary with grinding time, and pressure at which the samples were cold pressed. Thus known methods do not allow systematic control of homogeneous proportion of $Cr_2O_3$ in a composite. Additionally, in the known methods, varying oxygen pressure controls the proportion of $Cr_2O_3$ and a slight variation in experimental condition may adversely affect the reproducibility of physical properties.

Composites of $CrO_2$ and $Cr_2O_5$: $Cr_2O_5$ is another oxide of Cr which is insulating. The product $Cr_2O_5$ is a well known compound and is well documented in literature. However the composites of $CrO_2$ with $Cr_2O_5$ have not been studied in terms of % MR.

SUMMARY OF THE INVENTION

Therefore the object of the present invention is to provide half-metallic ferromagnet, substantially pure polycrystalline chromium dioxide ($CrO_2$) having saturation magnetization values close to the theoretical value.

Another object of the present invention is to provide pure polycrystalline chromium dioxide $CrO_2$, which can be obtained in cold pressed as well as sintered forms and which has enhanced magnetoresistance near room temperature.

Yet further object of the present invention is to provide composites of chromium dioxide and chromium sesquioxide ($CrO_2/Cr_2O_3$) which can be cold pressed as well as sintered.

Another object of the present invention is to provide composites of chromium dioxide and chromium sesquioxide ($CrO_2/Cr_2O_3$) which has enhanced magnetoresistance at low temperature as well as near room temperature.

A further object of the present invention is to provide composites of chromium dioxide and chromium sesquioxide ($CrO_2/Cr_2O_3$) which is substantially homogenous.

Yet another object of the present invention is to provide composites of chromium dioxide and chromium sesquioxide ($CrO_2/Cr_2O_3$) which can be obtained in any desired ratio of the constituent compounds.

Yet another object of the present invention is to provide a process for the manufacture of half metallic ferromagnet, substantially pure chromium dioxide ($CrO_2$), or composites of chromium dioxide and chromium sesquioxide ($CrO_2/Cr_2O_3$) which does not involve maintaining of high pressure as a control parameter during the process of synthesis.

A further object of the present invention is to provide a process for the manufacture of half metallic ferromagnet, substantially pure chromium dioxide ($CrO_2$), or composites of chromium dioxide and chromium sesquioxide ($CrO_2/Cr_2O_3$) which is simple and cost effective.

A further object of the present invention is to obtain composites of $CrO_2$ and other oxide of chromium such as $Cr_2O_5$ and study MR in this class of compounds.

A further object of the present invention is to provide a process of manufacture of polycrystalline samples of (a) substantially pure $CrO_2$ (b) composites of $CrO_2/Cr_2O_3$ (c) composites of $CrO_2/Cr_2O_5$ wherein a single tunable experimental parameter is needed to obtain (a), (b) and (c).

According to the present invention there is provided substantially pure chromium dioxide ($CrO_2$) having saturation magnetization of at least 120 emu/gm.

The present invention also provides composites of chromium dioxide and chromium sesquioxide ($CrO_2/Cr_2O_3$) having negative magnetoresistance of at least 0.5% near room temperature at 2 Tesla.

The present invention also provides composites of chromium dioxide and $Cr_2O_5$ ($CrO_2/Cr_2O_5$) having enhanced negative magnetoresistance of at least 0.5% near room temperature at 2 Tesla.

The present invention further provides a process for manufacture of half metallic ferromagnet, substantially pure chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) comprising heating an intermediate oxide of chromium to a temperature of between 350 and 500° C. for a period of between 1-5 hours whereby substantially pure chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) are formed.

DETAILED DESCRIPTION OF THE INVENTION

Half metallic ferromagnet, substantially pure chromium dioxide ($CrO_2$) according to the present invention exhibits saturation magnetization ($M_s$) of at least 120 emu/gm. Preferably the $M_S$ value is 135 emu/gm for cold pressed sample of $CrO_2$ and 126 emu/g for sintered pellets. As a consequence of such high purity of the sample, there is evidence of maintained spin polarization near room temperature and the chromium dioxide of the present invention exhibits negative magnetoresistance of at least 0.5% near room temperature at 2 Tesla, preferably 2% and most preferably 5% MR at room temperature at 2 Tesla for sintered pellet of pure $CrO_2$.

Composites of chromium dioxide and chromium sesquioxide ($CrO_2/Cr_2O_3$) according to the present invention have enhanced negative magnetoresistance of at least 0.5% near room temperature at 2 Tesla. More preferably, the composites have negative magnetoresistance of at least 2%, more preferably 5% near room temperature at 2 Tesla. Most preferably the negative magnetoresistance is 32% at room temperature and 2 Tesla in a sample of $CrO_2/Cr_2O_3$ composite. This composite contained nearly 40% $Cr_2O_3$. Composites of the present invention also show saturation magnetization of about 75 emu/gm at 5K for a 40% molar $Cr_2O_3$ composite and 103 emu/gm at 5K for a 25% molar $Cr_2O_3$ composite. Composites of the present invention can be obtained in sintered form facilitating bulk transport measurements. Moreover, the composites are obtainable in any ratio of the constituent compounds and are homogenous. The composites also show substantial reproducibility and are therefore appropriate for use as magnetoresistive materials in device applications.

Composites of chromium dioxide and $Cr_2O_5$ ($CrO_2/Cr_2O_5$) according to the present invention have enhanced negative magnetoresistance of at least 0.5% near room temperature at 2 Tesla. More preferably, the composites have negative magnetoresistance of at least 2%, more preferably 5% near room temperature at 2 Tesla. Most preferably the negative magnetoresistance is 22% at room temperature and 2 Tesla. Composites of the present invention also show saturation magnetization of around 60 emu/gm and preferably around 80 emu/gm at 5K where the fraction of $CrO_2$ is systematically varied. Composites of the present invention can be obtained in sintered form facilitating bulk transport measurements. Moreover, the composites are obtainable in any ratio of the constituent compounds and are homogenous. The composites also show substantial reproducibility and are therefore appropriate for use as magnetoresistive materials in device applications.

The process of the present invention comprises extraordinary simple steps for the manufacture of either half-metallic ferromagnetic chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) with following merits—(a) It does not require pressure as a control parameter (b) unlike prior art, no chemical modifier has been used to bring down the operating pressure during the synthesis. This is significant as addition of modifier may depolarize the spin. (c) For the first time, fairly hard, sintered pellets of $CrO_2$, $CrO_2/Cr_2O_3$ as well as $CrO_2/Cr_2O_5$ composites have been prepared. Most importantly, no chemical binder has been used to obtain sintered pellets. Earlier work reports either cold pressed pellets or the pellets hardened by using a chemical binder, which may depolarize the spin. (d) The saturation magnetization is found to be at least 120 emu/gm and particularly around 135 emu/g for the cold pressed and 126 emu/g for the sintered pellets of $CrO_2$. To the best of inventor's knowledge, this is the highest quoted value of $M_s$ compared to other samples reported in literature for bulk $CrO_2$. (e) The composites of $CrO_2/Cr_2O_3$ and $CrO_2/Cr_2O_5$ have shown significant negative MR near room temperatures as well as at low temperatures.

The process of present invention comprises the following reactions.

A: An intermediate oxide of chromium→$CrO_2$ or composite $CrO_2/Cr_2O_3$ or $CrO_2/Cr_2O_5$ by heating at 350-500° C. This intermediate oxide is primarily $Cr_8O_{21}$ with some traces of $Cr_2O_5$ as seen in X Ray Diffraction patterns. This intermediate oxide would be referred to as precursor subsequently.

According to the above process, when temperature is maintained between 380° C. and 400° C. $CrO_2$ is formed as the product (Step A1) and when the temperature is between 400° C. to 500° C. it gives $CrO_2/Cr_2O_3$ composites (Step A2). When the temperature is between 350° C. to 380° C. then $CrO_2/Cr_2O_5$ composites are formed (Step A3). The exact temperature for the formation of compound at step A1 or step A2 or step A3 depends on the quality of the precursor. For a given precursor, if temperature range of step A1 is shifted by a few degrees then there is a systematic shift in the temperature ranges of step A2 or step A3.

In step A, it is preferred to maintain the temperature of intermediate oxide in the specified range for 2-3 hours. To convert precursor to substantially pure $CrO_2$ according to step A1 it is preferred to maintain the temperature range between 390-400° C. and to convert precursor to the said composite of chromium dioxide and chromium sesquioxide ($CrO_2/Cr_2O_3$) according to step A2 the temperature range should be preferably maintained between 400-450° C. To convert precursor to the said composites of $CrO_2$ and $Cr_2O_5$ ($CrO_2/Cr_2O_5$) according to step A3, the temperature range should be between 350 to 390° C.

According to a preferred aspect intermediate oxide is prepared from $CrO_3$ by heating the $CrO_3$ and maintaining the temperature from 220-330° C. for 6 to 14 hours, preferably for 8-12 hours, with or without oxygen flow. It is further preferred to maintain a temperature in the range of 230-280° C. and oxygen flow.

$CrO_3$ is taken in an inert container and heated slowly to raise the temperature to about 250° C. and thereafter maintained in the temperature range of 250° C.-270° C. for about 8-12 hours in dry oxygen/air at about atmospheric pressure, till it is converted to said precursor which is a specific intermediate oxide of Chromium, primarily $Cr_8O_{21}$ as characterized by X ray diffraction. Thereafter precursor is cooled to room temperature at the same rate as was used for raising the temperature initially.

The precursor so formed is crushed in any inert vessel to form a powder and then the powder is sealed in a glass tube of inert material. The powder can also be pelletized and sintered before sealing it in the inert tube. Thereafter the tube is placed in a preheated furnace maintained at a temperature in the range of about 350-500° C. for about 2-3 hours till it is converted to said half-metallic ferromagnet viz. said substantially pure chromium dioxide $CrO_2$ when at 390-400° C. or a composite of chromium dioxide and chromium sesquioxide ($CrO_2/Cr_2O_3$) when at 400-500° C., or a composite of $CrO_2$ and $Cr_2O_5$ when at 350-390° C. as characterized by XRD.

The sealed tube is then opened after cooling it to ambient temperature and the contents are stored in any dry container.

After lot of experimentation we have found that the stoichiometry of the final product at a certain temperature depends on the quality of precursor. It is found that stoichiometric $CrO_2$ can be prepared even if oxygen flow was not maintained while making the precursor though it is preferable to maintain the oxygen flow. A slight variation in experimental conditions leads to the formation of undesirable impurity in the precursor, which may adversely affect the quality of $CrO_2$. Further, in case of composites of $CrO_2/Cr_2O_3$, the ratio of mass fraction of $Cr_2O_3$ in $CrO_2$ can be systematically varied by varying the temperature in step A2 for making a composite in desired ratio. Same holds true for the $CrO_2/Cr_2O_5$ composites.

U.S. Pat. No. 3,493,338 teaches a one step reaction: $CrO_3$→$CrO_2$. There is no isolation of the intermediate product. Heat treatment cycle is as follows: RT→175° C. in 10 min.→225° C. in 1 hour→325° C. in 20 min. and maintained at 325 for 2 hrs. All the while there is gas (—a mixture of 3.5% NO and $O_2$) flow at normal atmospheric pressure is run over the boat carrying $CrO_3$ at about 200 cc/min. The $M_s$ value of the $CrO_2$ obtained is ~84 emu/g, whereas that in the present process product is ~132 emu/g.

The U.S. Pat. No. 3,117,093 teaches two step process, the second step starting with $Cr_xO_y$ with average chromium valance ratio (2y/x) of 4.2-4.3 This is mixed with water and other modifiers such as antimony sesquioxide inside a platinum tube and reaction carried out under a pressure of 50-3000 Atm. There are, however 3 examples (No. 14, 15 and 16) in this patent, which describe the process without any modifier. The first step starts with chromic nitrate monohydrate; it is heated at 330° C. for 2 hours to obtain an intermediate chromium oxide $Cr_xO_y$ not a well-defined compound as said above. In these three examples the reaction $Cr_xO_y$→$CrO_2$ was carried out at 400° C. for 1 to 2 hours. This starting material $Cr_xO_y$ was either moist 3-9% moisture or taken water for milling before heat treatment. Though in these examples there is no mention about pressure, the reaction has been claimed to be done at from 50-3000 atmosphere pressure. It will be clearly seen that the Step A of the present invention is different from this prior art. The starting material in step B of the present invention is different from this prior art. Step B in the present invention is in dry state that in these examples without modifier in the U.S. Pat. No. 3,117,093 is in the moist state. The temperature of the reaction at step B is 400° C. at 750 atmospheres and 17% water, in the U.S. Pat. No. 3,117,093. Conditions are therefore different in the present invention for production of $CrO_2$.

Thus the process of present invention is different from this prior art process.

In the process taught in U.S. Pat. No. 5,856,008, the reaction $CrO_3 \rightarrow CrO_2$ is carried out in a gold capsule at 35 kbar pressure at 520° C. for 2 hours in a piston cylinder type high pressure furnace; on cooling to room temperature the pressure is removed.

Thus this is a one step reaction different from the process of present invention. The $CrO_2$ thus obtained is annealed for 30 minutes in air at 380° C., and another sample at 420° C. And it is believed that in this process $CrO_2$ gets a thick surface coating of $Cr_2O_3$ which may inhibit electrical conduction.

In the process of present invention, $CrO_3 \rightarrow$ intermediate oxide (precursor)$\rightarrow CrO_2$ or composite $CrO_2/Cr_2O_3$ or composite $CrO_2/Cr_2O_5$ by heating precursor in sealed glass tube at 350-450° C. while using preheated furnace for any given temperature, and is clearly different from U.S. Pat. No. 5,856,008. The process of present invention for manufacture of composites is simpler and does not need pressure as a control parameter. Besides in present invention, it is possible to obtain sintered pellets of the composite in which mass fraction of $Cr_2O_3$ or $Cr_2O_5$ can be precisely controlled. Depending on the grinding time before pelletization of the intermediate oxide, we speculate that it is possible to vary the grain size of metallic $CrO_2$ in insulating $Cr_2O_3$ (the $CrO_2/Cr_2O_3$ composites) or in insulating $Cr_2O_5$ (the $CrO_2/Cr_2O_5$ composites)

EXAMPLES

The invention will now be illustrated with the help of examples. The examples are by way of illustration only and in no way restrict the scope of the invention.

Equipment Used:

The equipment used in these examples is a tubular furnace (Carbolite model CTF12/65 furnace). The furnace has a temperature range up to 1200° C. and has the arrangement for flow of inert or oxygen flow.

Inert containers used for reaction are chosen from quartz, Pyrex glassware.

Chemicals used:

$CrO_3$ granules with 99.9% purity were obtained from Aldrich Chemical Company, USA. Alternatively, $CrO_3$ flakes can also be used as a starting material.

Analytical Facilities used:

Siemens Diffractometer (Model D-500): for powder X-ray diffraction measurements (XRD).

Wave Dispersive Electron Probe Microanalyser (CAM-ECA Model EPMA SX-100): for scanning electron microscopy (SEM).

Vibrating Sample Magnetometer (Oxford MagLab VSM) and SQUID magnetometer (Quantum Design MPMS-XL7): for magnetization measurements.

Physical Properties Measurement System (Quantum Design PPMS-9) and home made Magnetoresistance set-up: for magnetoresistance measurements.

Program DBWS 486 was used for Rietveld profile refinement of XRD data. (R. A. Young, A. Sakthivel, T. S. Moss and C. O. Paovasantos, User's Guide to program DBWS-9411 (Georgia institute of technology, Atlanta 1994).)

Standard JCPDS data were used to identify the Bragg Peaks in XRD

BRIEF DESCRIPTION OF THE DRAWINGS

FIG. 1($f$)-($g$): X-Ray diffraction pattern (2θ vs. Intensity) for the product of Examples VI, VII respectively; Solid lines are Rietveld X-ray profile refinement fit to the experimental data. These samples are $CrO_2/Cr_2O_3$ composites. The X-ray diffraction measurements shown in FIG. 1($f$) and 1($g$) show the distinct Bragg peaks corresponding to $CrO_2$ and $Cr_2O_3$ phase.

FIG. 1($h$)-($i$): X-Ray diffraction pattern (2θ vs. Intensity) for the product of Examples VIII, IX respectively; These samples are $CrO_2/Cr_2O_5$ composites. The X-ray diffraction measurements shown in FIG. 1($h$) and FIG. 1($i$) show the distinct Bragg peaks corresponding to $CrO_2$ and $Cr_2O_5$ phase.

FIG. 3($b$): Magnetization (M) as a function of magnetic field (H) for the products of Examples VI and Example VII which are $CrO_2/Cr_2O_3$ composites, at 5 K. The saturation magnetization ($M_s$) is found to be 75 emu/g for the product of example VI which is a sintered $CrO_2/Cr_2O_3$ composite, and it is about 103 emu/g for the product of example VII which is a cold pressed (unsintered) composite.

FIG. 3($c$): Magnetization (M) as a function of magnetic field (H) for the products of Examples VIII and Example IX which are $CrO_2/Cr_2O_5$ composites, at 5 K. The saturation magnetization ($M_s$) is found to be 60 emu/g for the product of example VIII, and it is about 80 emu/g for the product of example IX. Both composites are sintered pellets.

FIG. 4($b$). % Magnetoresistance (MR) as a function of temperature for sample in example V which is a sintered pellet of $CrO_2$. Here the Magnetic Field H is perpendicular to the direction of current during the measurement using PPMS system. The negative MR room temperature is about 3% at 2 Tesla.

FIG. 4($c$). % Magnetoresistance (MR) as a function of temperature for sample in example VI which is a sintered composite of $CrO_2/Cr_2O_3$ The mass fraction of $Cr_2O_3$ in this sample is determined to be about 40% from Rietveld Profile refinement technique. The room temperature negative MR is about 32% at 2 Tesla.

Example I

Chromium trioxide ($CrO_3$) was taken in a Pyrex glass tube and it was heated slowly to raise the temperature to about 250° C., and thereafter the temperature was maintained at 250° C., for 10 hours under oxygen flow at about atmospheric pressure. The end product was a mixture of intermediate oxide $Cr_8O_{21}$ with traces of other intermediate oxide $Cr_2O_5$. This end product forms in a hard bar, which was crushed and powdered using agate mortar.

This powder of intermediate oxide (approx. 500 mg) obtained as above, was placed inside a Pyrex glass tube of 12 cm length and 1.5 cm diameter. The glass tube was sealed at atmospheric pressure and the ampoule was kept in a preheated tube furnace at 392° C. for 2 hours. The sealed glass tube was taken out from the furnace at the same temperature and thereafter it is opened at ambient temperature.

Figure 1A:
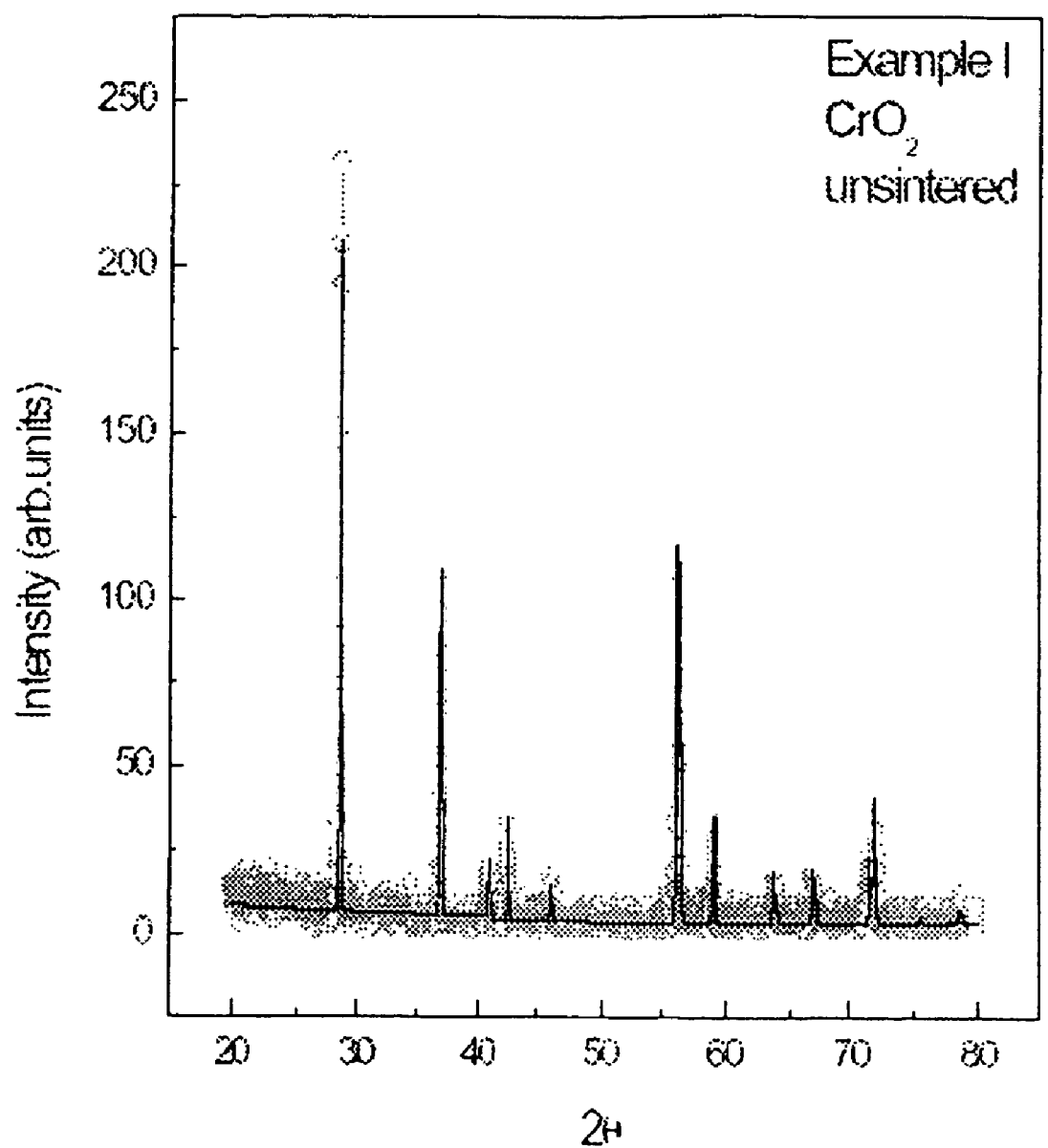
FIG. 1($a$)-($e$): X-Ray diffraction pattern (2θ vs. Intensity) for the product of Examples I, II, III, IV, V respectively. Solid lines are Rietveld X-ray profile refinement fit to the experimental data. The fitting is done using Rietveld profile refinement program. These samples are pure and Stoichiometric $CrO_2$ in which no detectable impurity phases were found in X-ray diffraction measurements.

X-ray diffraction, Rietveld refinement of powder XRD (R. A. Young et al Program DBWS-9411, 1994) was performed on this sample. The results are shown in FIG. 1(a). This product was therefore $CrO_2$ as evident from XRD pattern.

The powder was examined for the measurement of saturation magnetization on a SQUID magnetometer (Model MPMS-XL7 of Quantum Design, USA). At a temperature of 5K, this powder shows saturation magnetization ($M_s$) as large as 132 emu/gm, which is very close to the theoretically predicted value 135 emu/gm (see E. P. Wohlfarth, Ferromagnetic Materials Vol. 2, 471, 1980) [See FIG. 3a]. This proved that the $CrO_2$ product obtained at the end of Example I was a substantially pure material. For comparison of reported $M_s$ values of different $CrO_2$, see Table 2. The product of Example I—has the substantially high $M_s$ value and it is very close to the theoretical value.

Example II

Figure 1B:
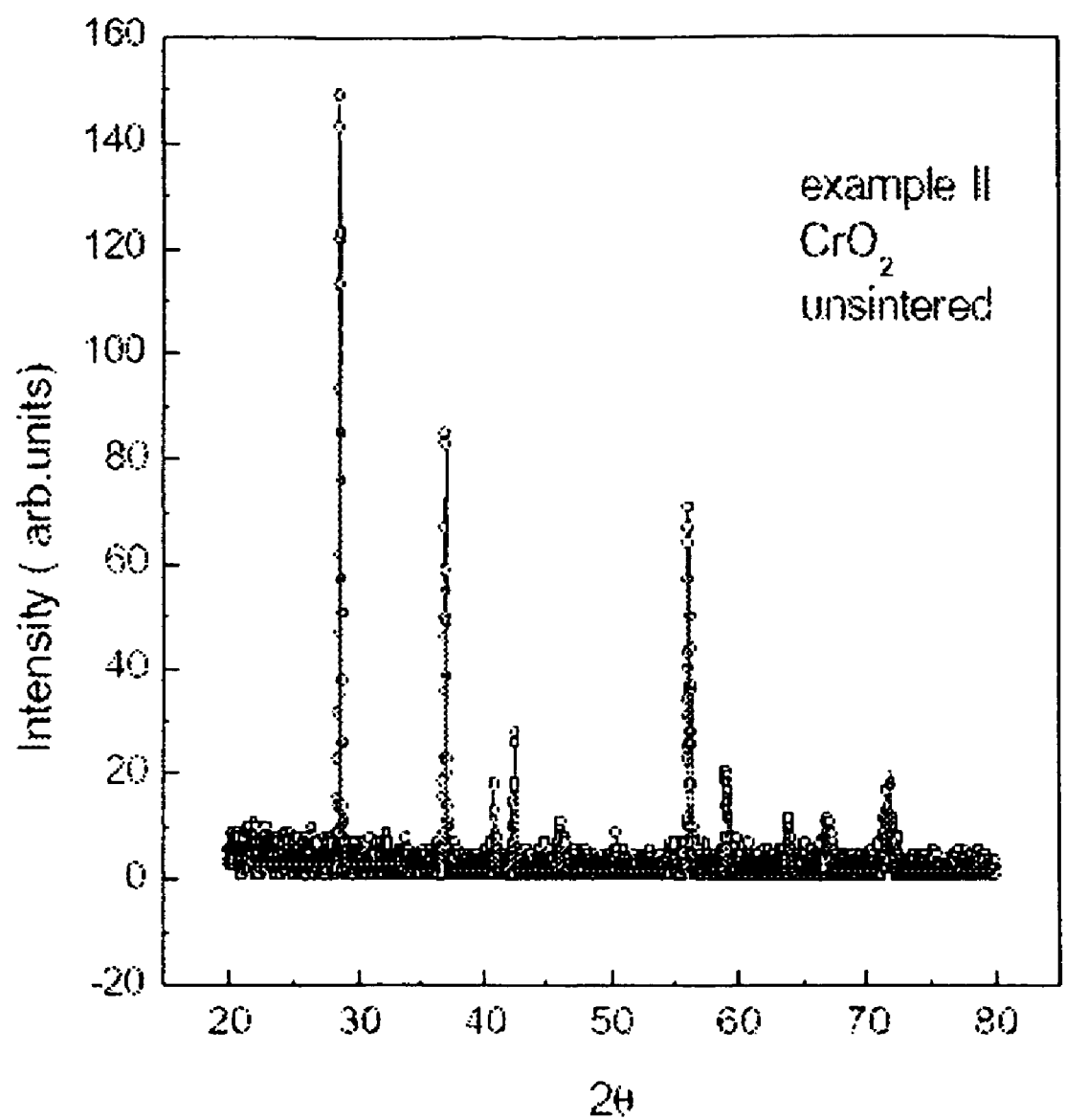

The procedure of Example I was repeated, the only change being the precurser (1.5 g) was sealed inside a test tube of 1 cm diameter and 10 cm length. It was placed in the furnace at 392° C. for 2 hrs. The final product was stoichiometric $CrO_2$, and was identical with product of Example I in the above tests. The product of present invention is $CrO_2$ of polycrystalline type as confirmed by X-ray diffraction measurements, where no impurity peaks are observed (FIG. 1(b)).

Example III

Figure 1C:
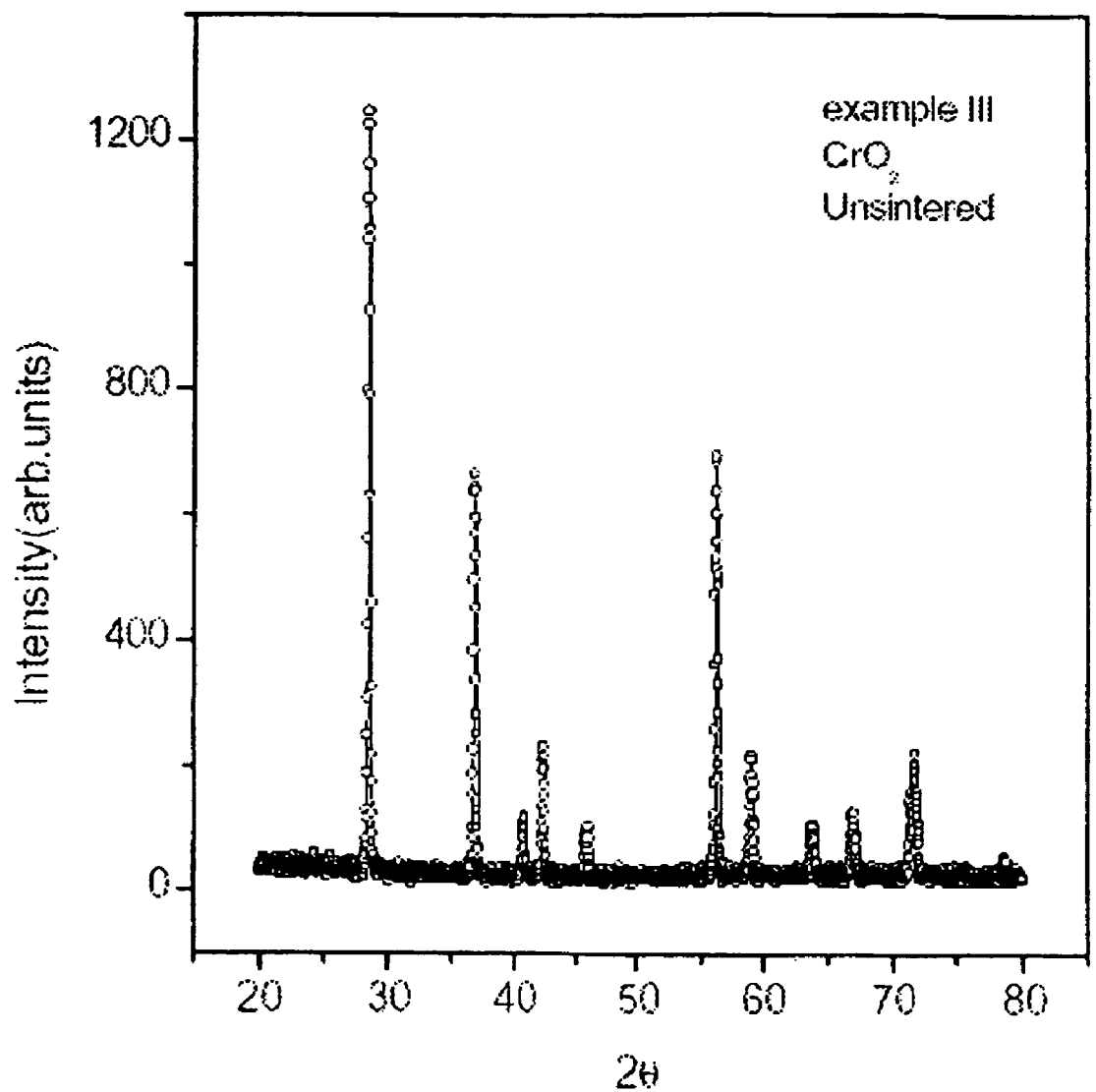

The procedure of Example I was repeated, the change being the precursor (1.5 g) was sealed inside a test tube of 1 cm diameter and 10 cm length. It was placed in the furnace at 400° C. for 2 hrs. The final product is $CrO_2$ of polycrystalline type as confirmed by X-ray diffraction measurements, where no impurity peaks are observed (FIG. 1(c)). The powder was examined through the measurement of saturation magnetization on SQUID magnetometer. At a temperature of 5K, this powder shows saturation magnetization ($M_s$) as large as 135 emu/g (see FIG. 3(a)) It will be seen that this is the only compound -the product of example III which has the highest $M_S$ value.

Example IV

The procedure of Example I was repeated, the only change being precursor (about 1 g) was ground for few hours and pelletized in the form of a pellet of about 1.2 cm diameter and 0.2 cm thickness. This pellet was sintered at 250° C. for few hours in tubular furnace. It was cooled to room temperature and was then sealed in a glass ampoule at atmospheric pressure. This ampoule was kept in the oven at 392° C. for 2 hrs. The final product was a fairly hard pellet of stoichiometric $CrO_2$.

Figure 2:
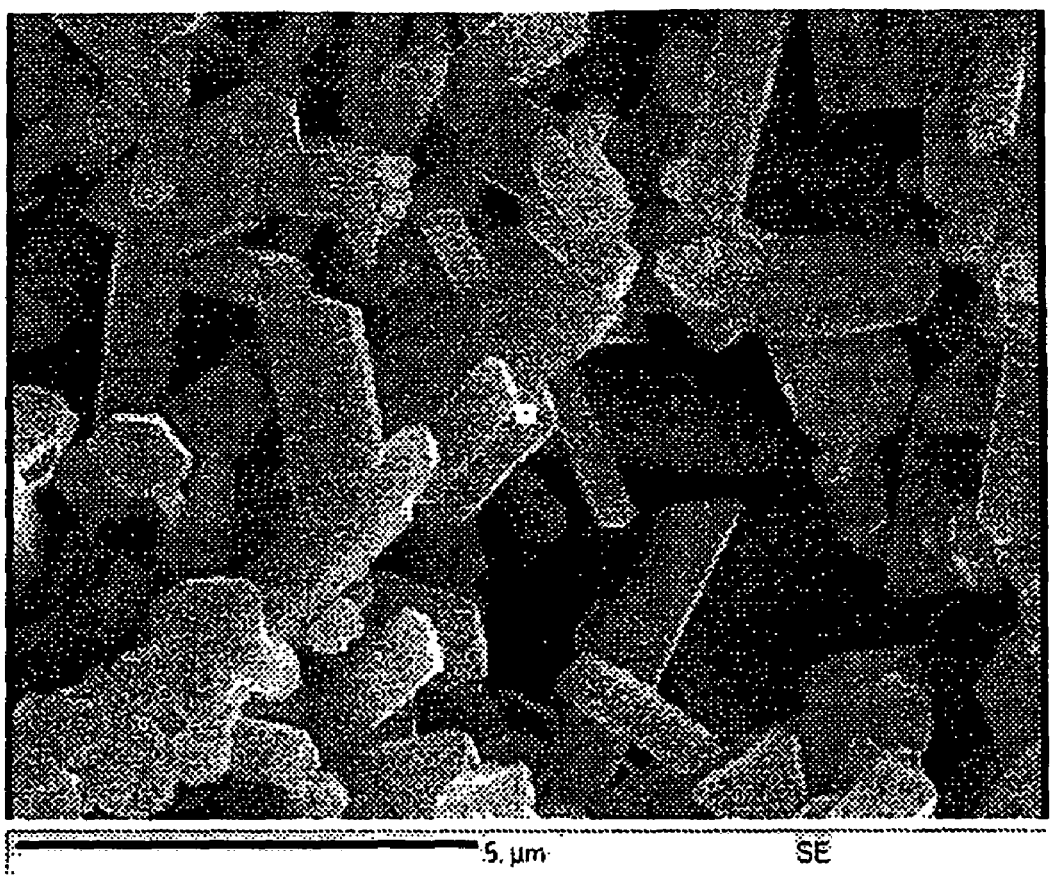
FIG. 2: Scanning Electron Micrograph of the product of Example IV. The Long Needle shaped structures show the regular shape of $CrO_2$ particles.

The product of Example IV was examined at room temperature under Scanning Electron Microscope (SEM). The SEM analysis was done on electron probe microanalysis (EPMA) system (model SX-100 from M/s CAMAC, France). The SEM picture is shown in FIG. 2, where long needle shaped grain are seen.

Figure 1D:
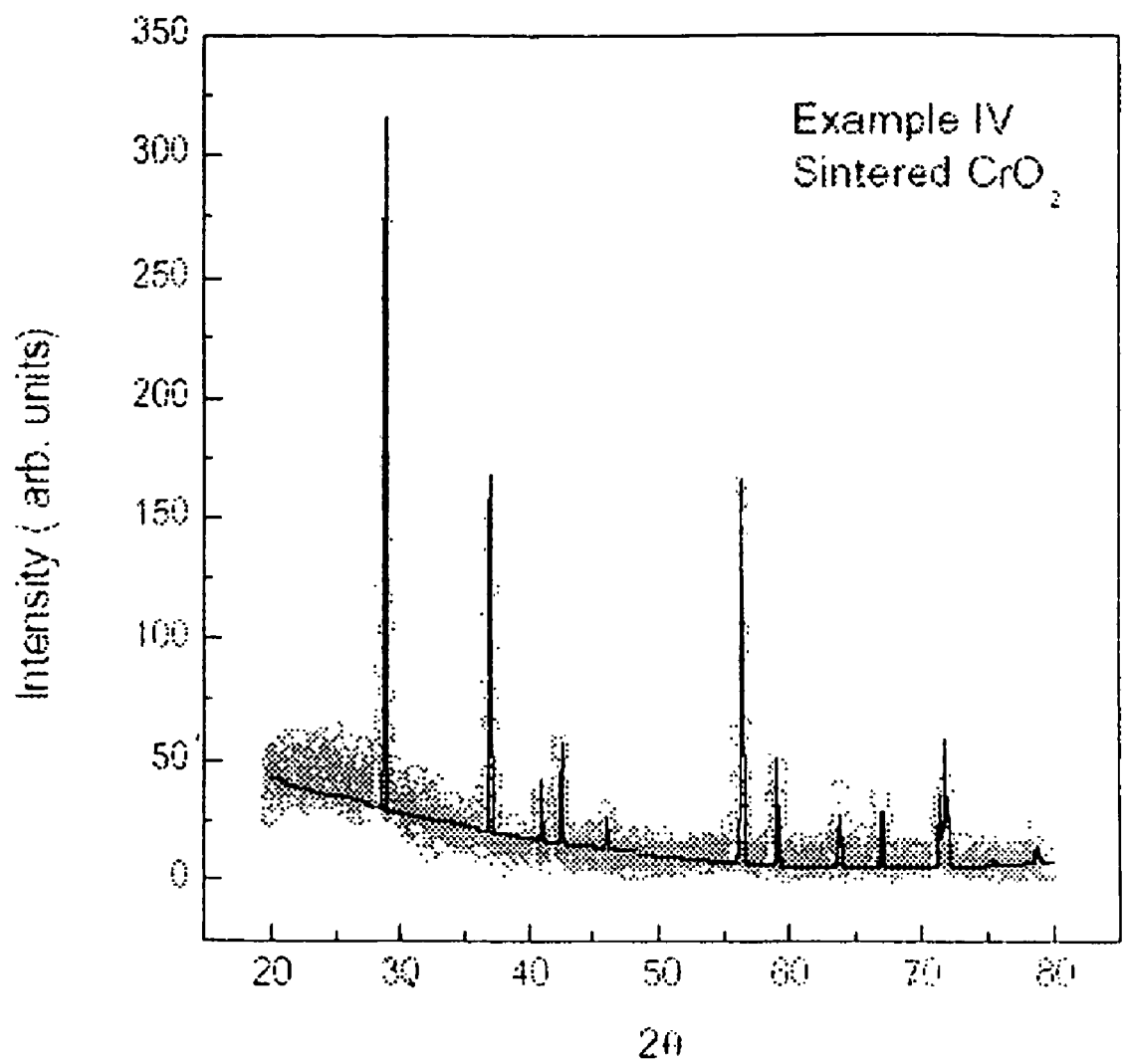

The X-ray diffraction measurement was done as in Example I and results are shown in FIG. 1(d).

Figure 3A:
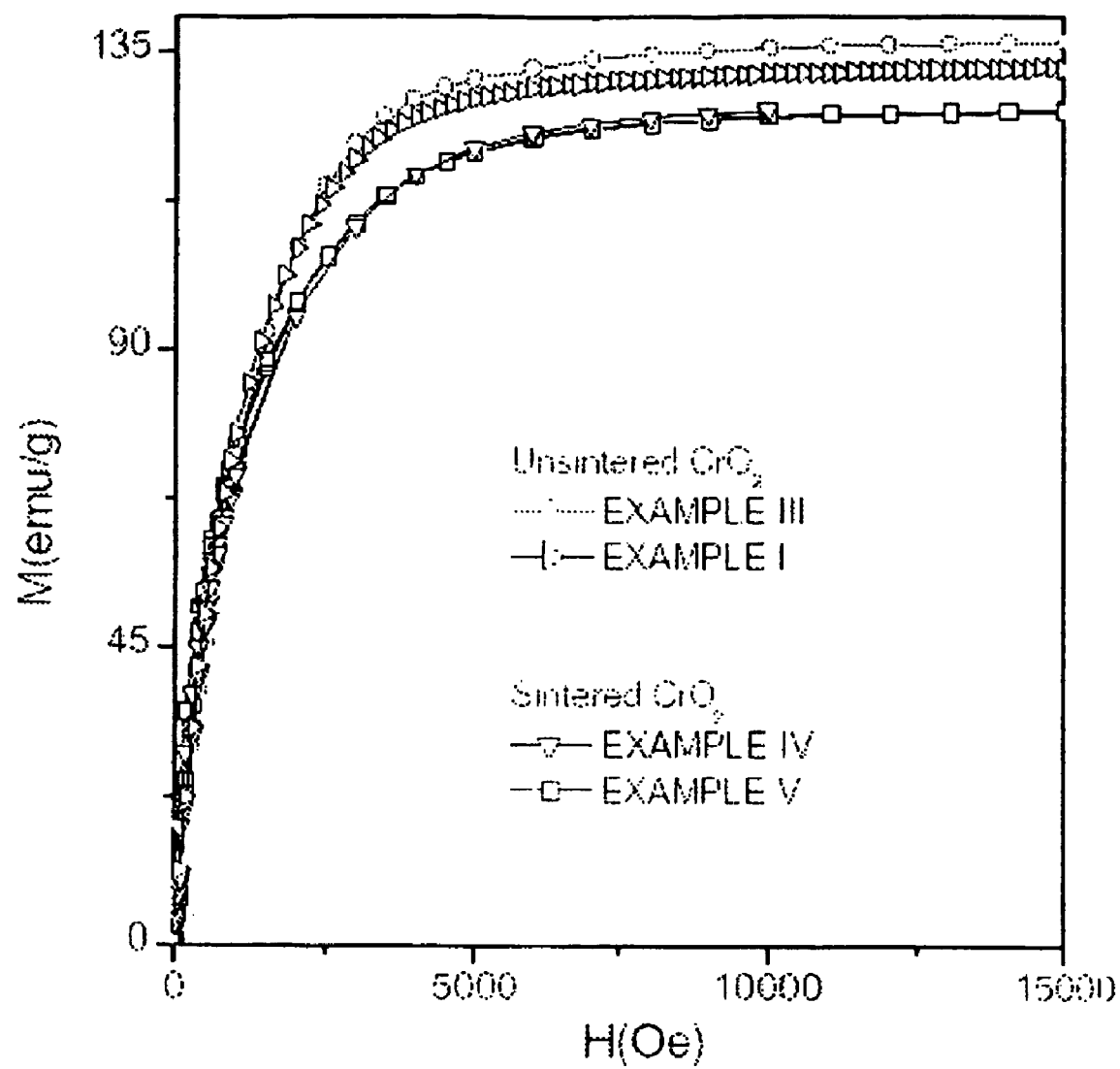
FIG. 3($a$): Magnetization (M) as a function of magnetic field (H) for the products of Examples I, III, IV, V at 5 K. The saturation magnetization ($M_s$) is found to be 132 and 135 emu/g for the cold pressed $CrO_2$ (example I & example III) and 126 and 127 emu/g for the sintered $CrO_2$ (example IV and example V).

The product of Example IV was examined for the measurement of saturation magnetization ($M_s$) as in Example I. The results are shown in FIG. 3a. The saturation magnetization is of the order of 126 emu/gm for this sample at 5 K (Table 3).

Figure 4A:
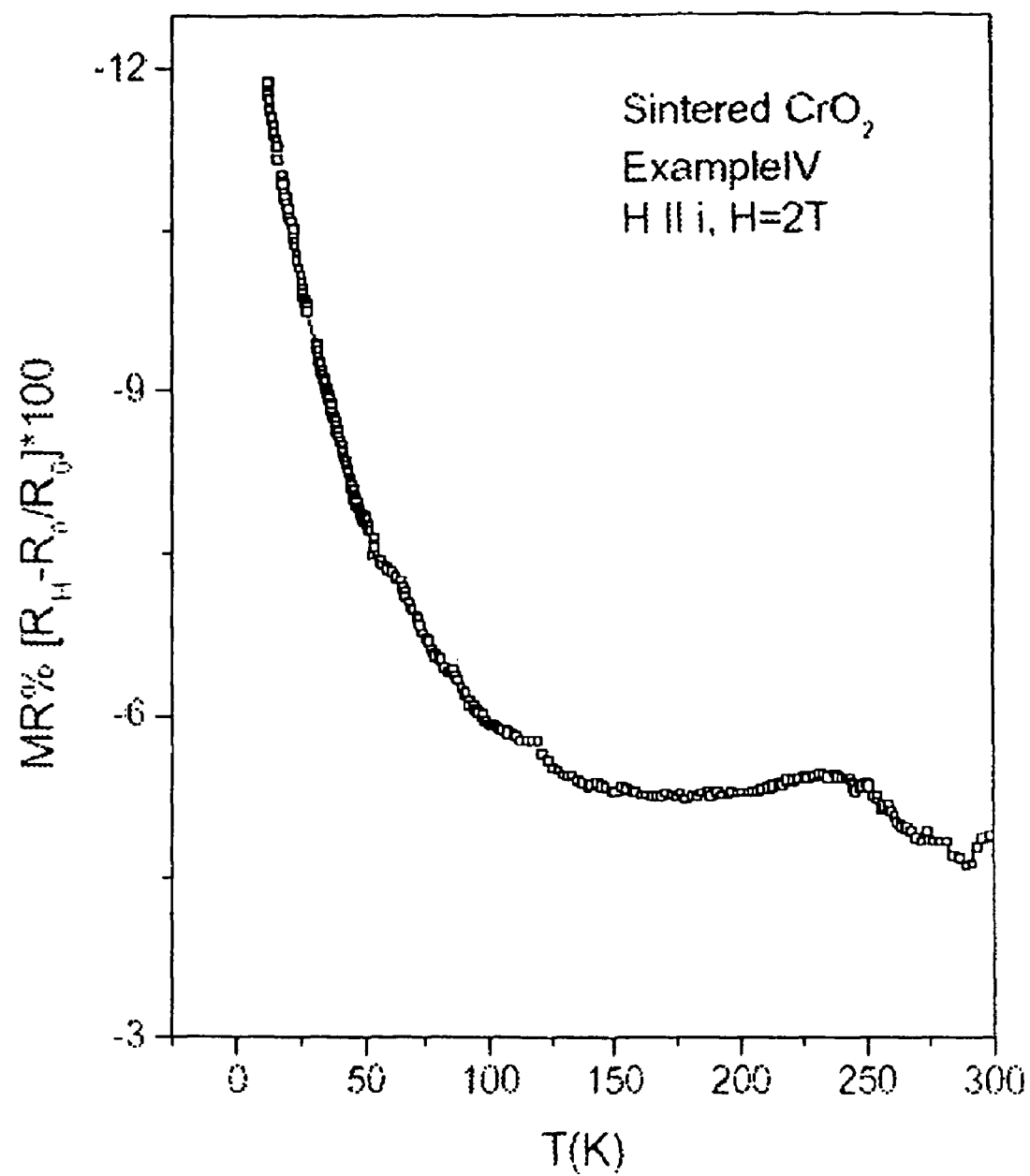
FIG. 4($a$). % Magnetoresistance (MR) as a function of temperature for sample in example IV which is a pure and sintered $CrO_2$. Here the Magnetic Field H is parallel to the direction of current during the measurement. negative MR near room temperature is about 5% at 2 Tesla as opposed to 0.1% quoted by J M D Coey et al for polycrystalline $CrO_2$.
FIG. 4(d). % Magnetoresistance (MR) as a function of temperature for sample in example VII which is an unsintered composite of $CrO_2/Cr_2O_3$. The mass fraction of $Cr_2O_3$ in this composites is about 25% as determined from the Rietveld profile refinement of X ray data. The room temperature negative MR is about 8% at 2 Tesla.
FIG. 4(e). % Magnetoresistance (MR) as a function of temperature for sample in example VIII which is a sintered composite of $CrO_2/Cr_2O_5$. The negative MR at room temperature is about 22% at 2 Tesla.
FIG. 4(f). % Magnetoresistance (MR) as a function of temperature for sample in example IX which is a sintered composite of $CrO_2/Cr_2O_5$. The Mass fraction of $Cr_2O_5$ is less in this composites as compared to the composite of example VIII as evident from X ray and Magnetization measurements. The negative MR at room temperature is about 8% at 2 Tesla.

Magnetoresistance measurements were conducted on this sample in the temperature range from 5 K to 300 K in the presence of magnetic fields of the order of 2 Tesla. The applied magnetic field H was parallel to the direction of the current i during the measurement (H||i). Large negative MR defined as $(R_H-R_0)/R_0$ was obtained as shown in FIG. 4a. Significant negative MR of the order of 5% was obtained near room temperature as shown in FIG. 4a.

Example V

Figure 1E:
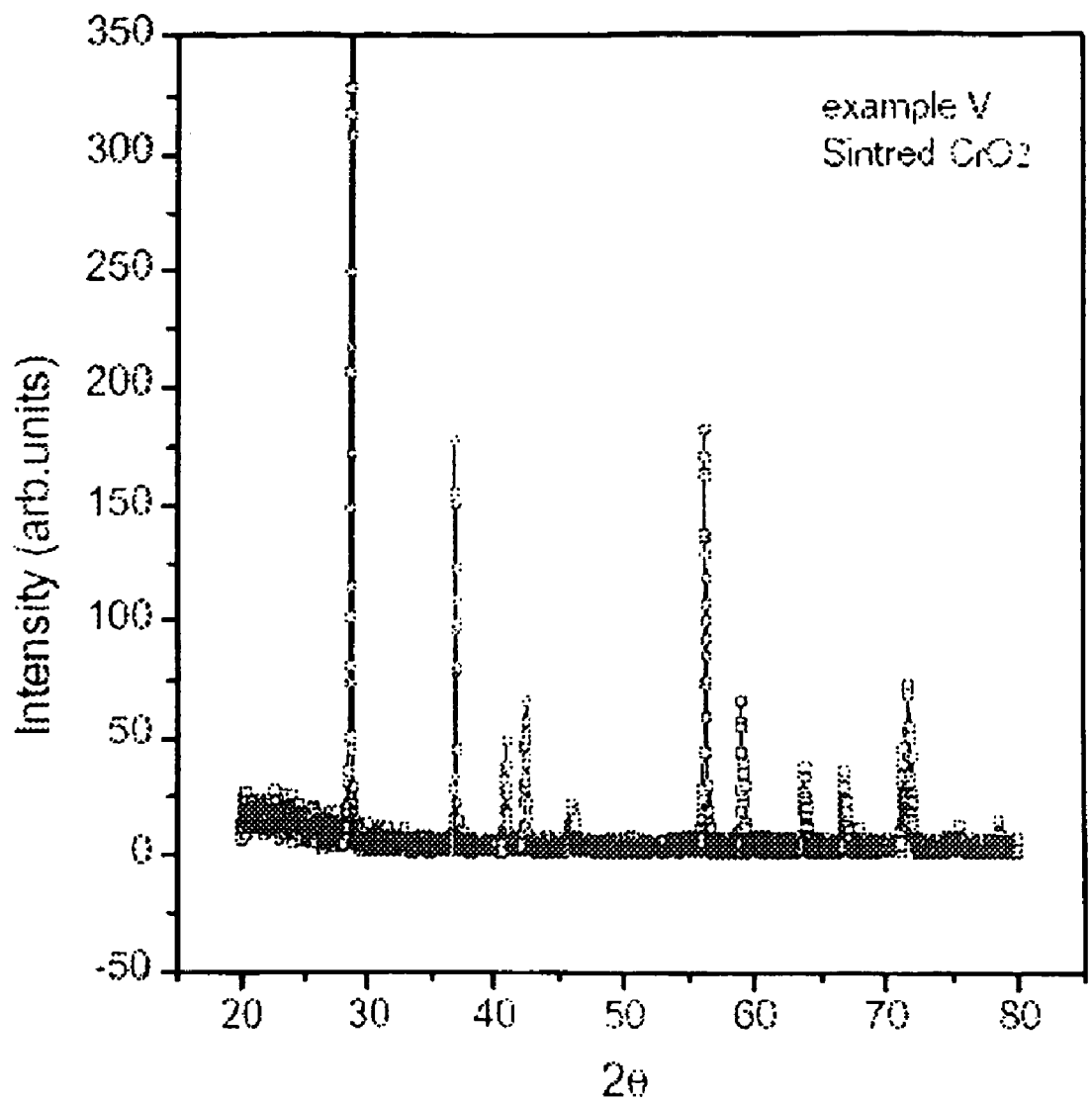

The procedure of example IV was repeated with the only change that that the precurser in the form of sintered pellet was kept in the preheated furnace at 400° C. The results of X-ray diffraction are shown in FIG. 1(e).

The product of Example V was examined through the measurement of saturation magnetization ($M_s$) as in Example I. The results are shown in FIG. 3a. The saturation magnetization is of the order of 127 emu/gm for this sample at 5 K (Table 1). We also find that by varying the time of sintering of the intermediate oxide after pelletizing, the hardness of the pellet can be varied as may be required for some specific application.

Figure 4B:
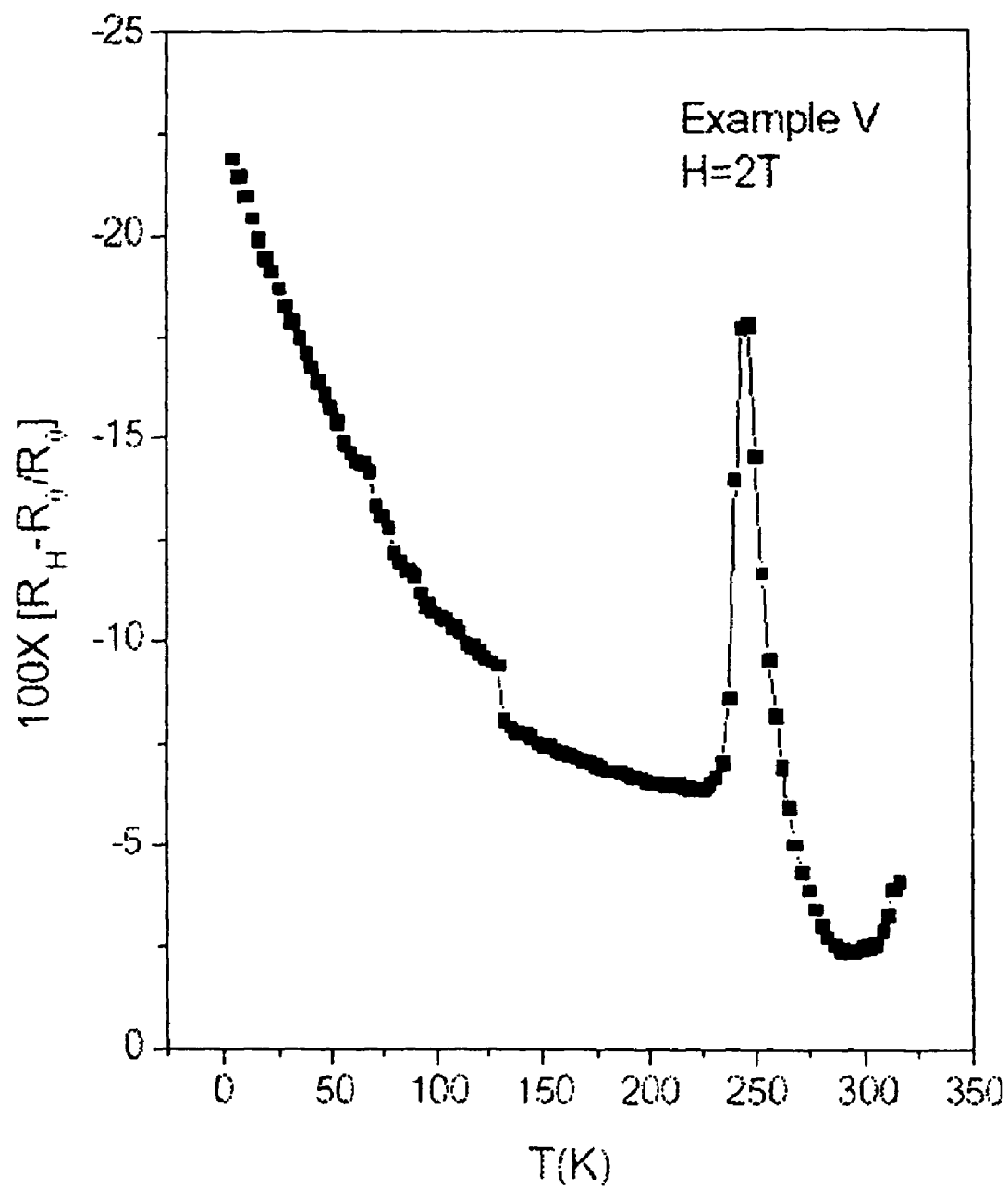

Magnetoresistance measurements were conducted on this sample in the temperature range from 5 K to 300 K in the presence of magnetic fields of the order of 2 T. Here the applied magnetic field H was perpendicular to the direction of the current during the MR measurement (H⊥i) Large negative MR defined as $(R_H-R_0)/R_0$ was obtained as shown in FIG. 4b. Significant negative MR of the order of 3% was obtained near room temperature as shown in FIG. 4b.

Example VI

The procedure of Example V was repeated, with the only change of precursor in the form of sintered pellet (1 g) was sealed in a glass tube which was kept in the oven maintained at temperature at around 420° C.

Figure 1F:
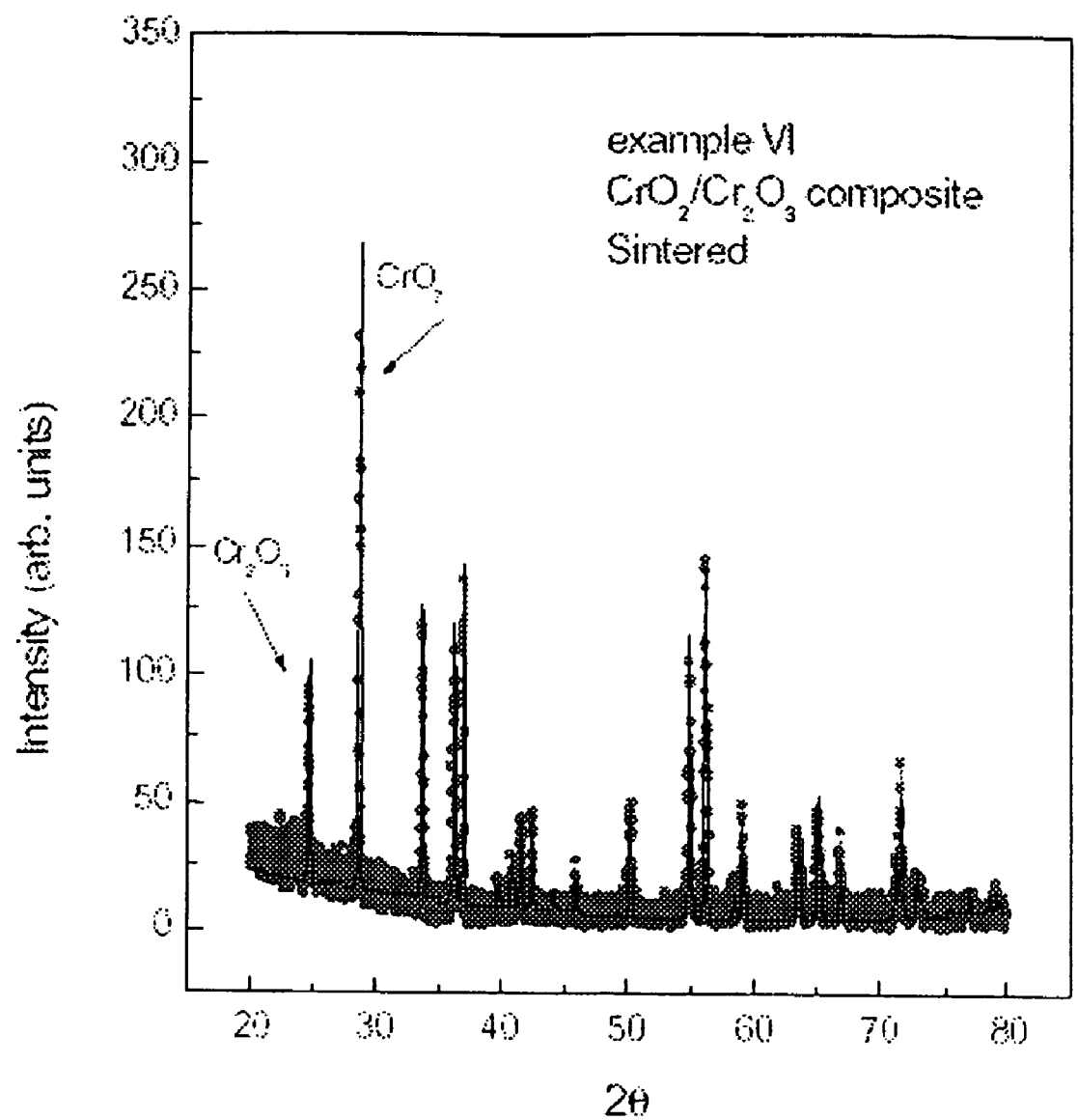

The X-ray diffraction examination was done as in Example VI and the results are shown in FIG. 1(f). The product formed was found to be a composite of $CrO_2/Cr_2O_3$ from XRD.

The fraction of insulating $Cr_2O_3$ was also determined to be 40% (molar).

The product of Example VI was examined for $M_s$ value, as in Example I. (See FIG. 3b). The $M_s$ value found to be 75 emu/gm at 5 K.

Figure 4C:
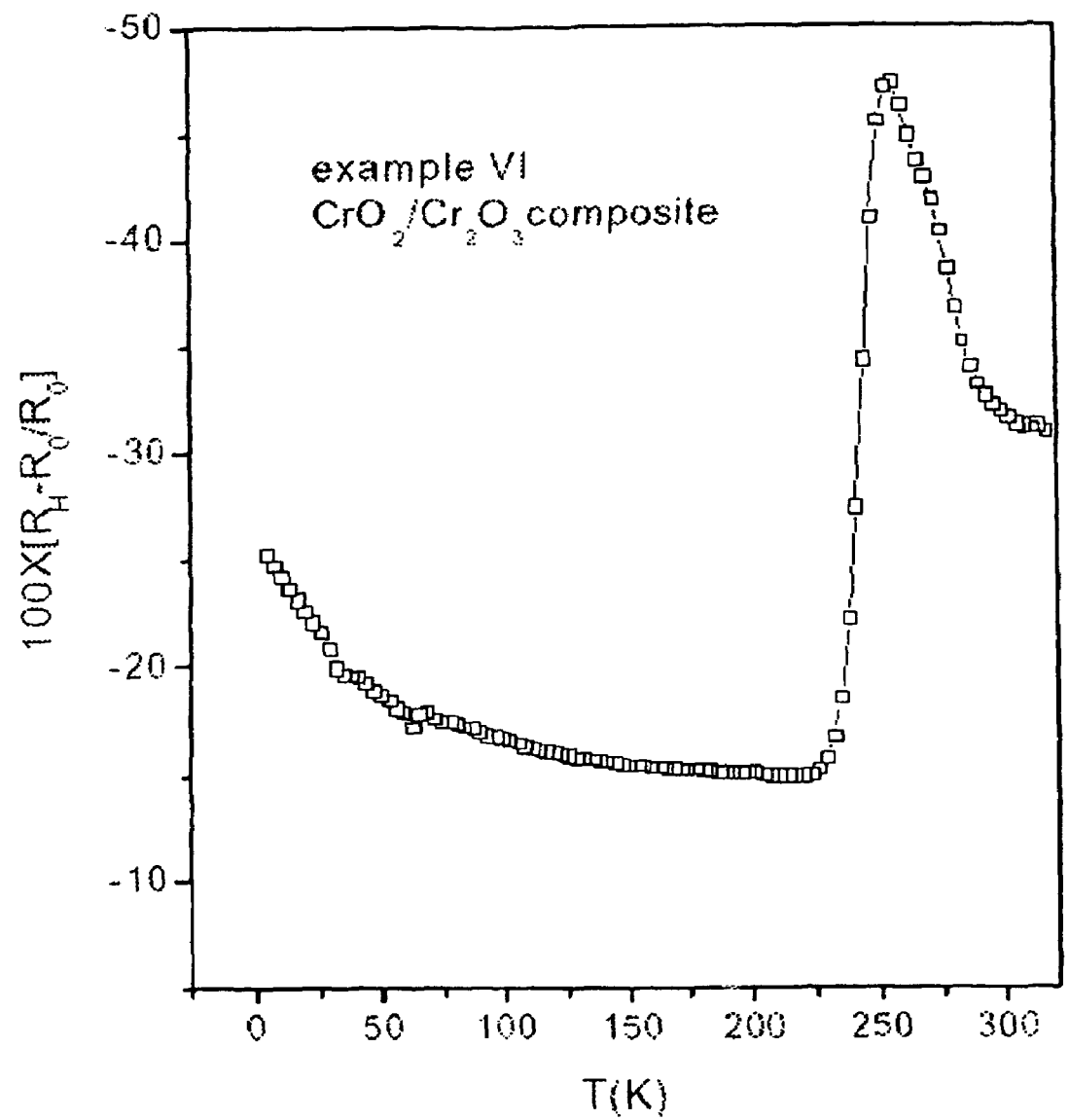

Magnetoresistance measurements were conducted on this sample in the temperature range from 5 K to 300 K in the presence of magnetic fields of the order of 2 T. (H⊥i) Large negative MR defined as $(R_H-R_0)/R_0$ was obtained as shown in FIG. 4c. Significant negative MR of the order of 33% was obtained near room temperature as shown in FIG. 4c.

Example VII

Figure 1G:
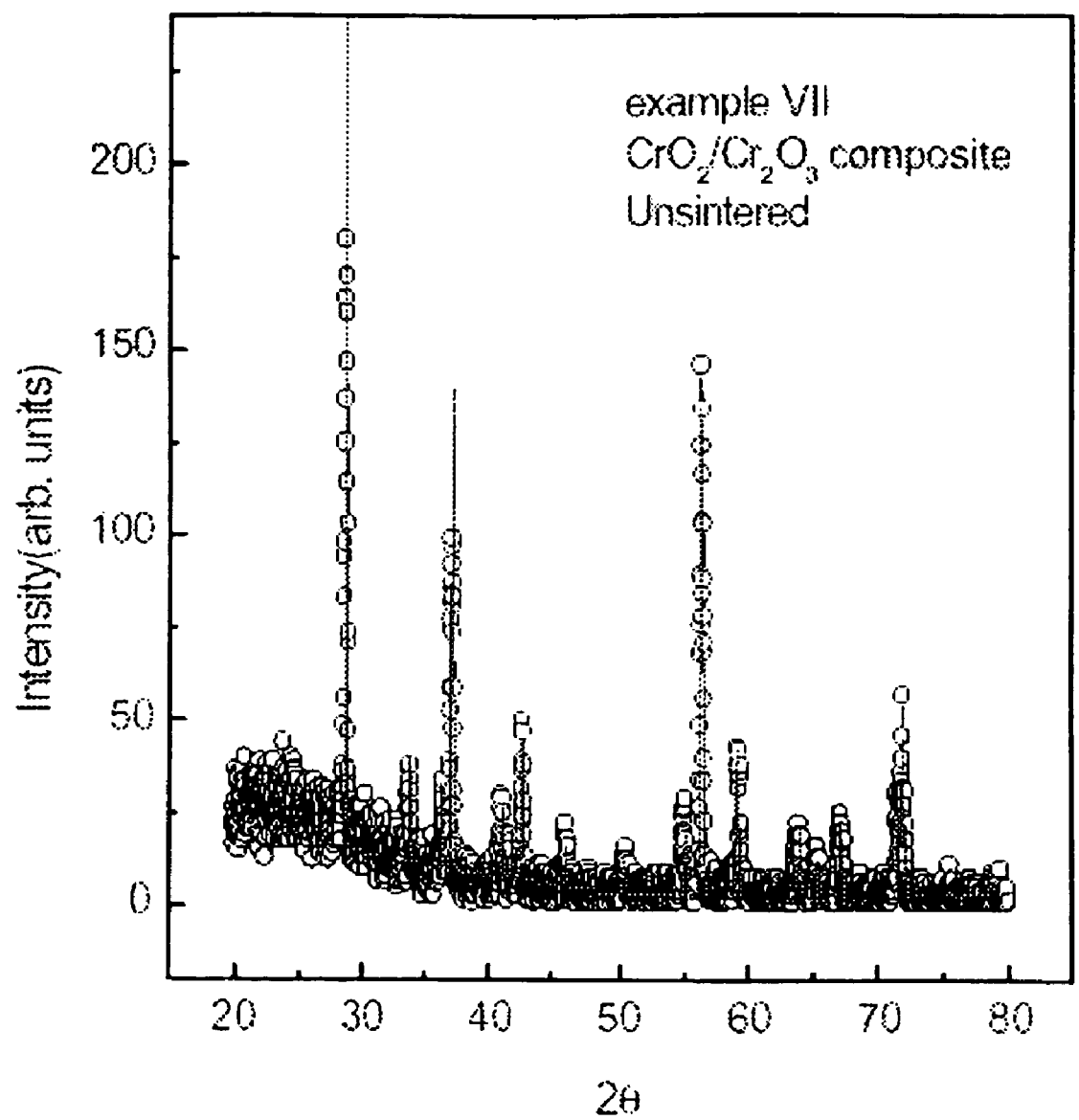

The procedure of Example I was repeated, with the only change of precursor in the powder form (1 g) sealed in a glass tube was kept in the tube furnace maintained at temperature at around 410° C. The X-ray diffraction examination was done as in Example I and the results are shown in FIG. 1(g). The product formed was found to be a composite of $CrO_2/Cr_2O_3$ from XRD.

The fraction of insulating $Cr_2O_3$ was also determined to be 25% (molar) from the Rietveld profile refinement of X-ray data.

Figure 3B:
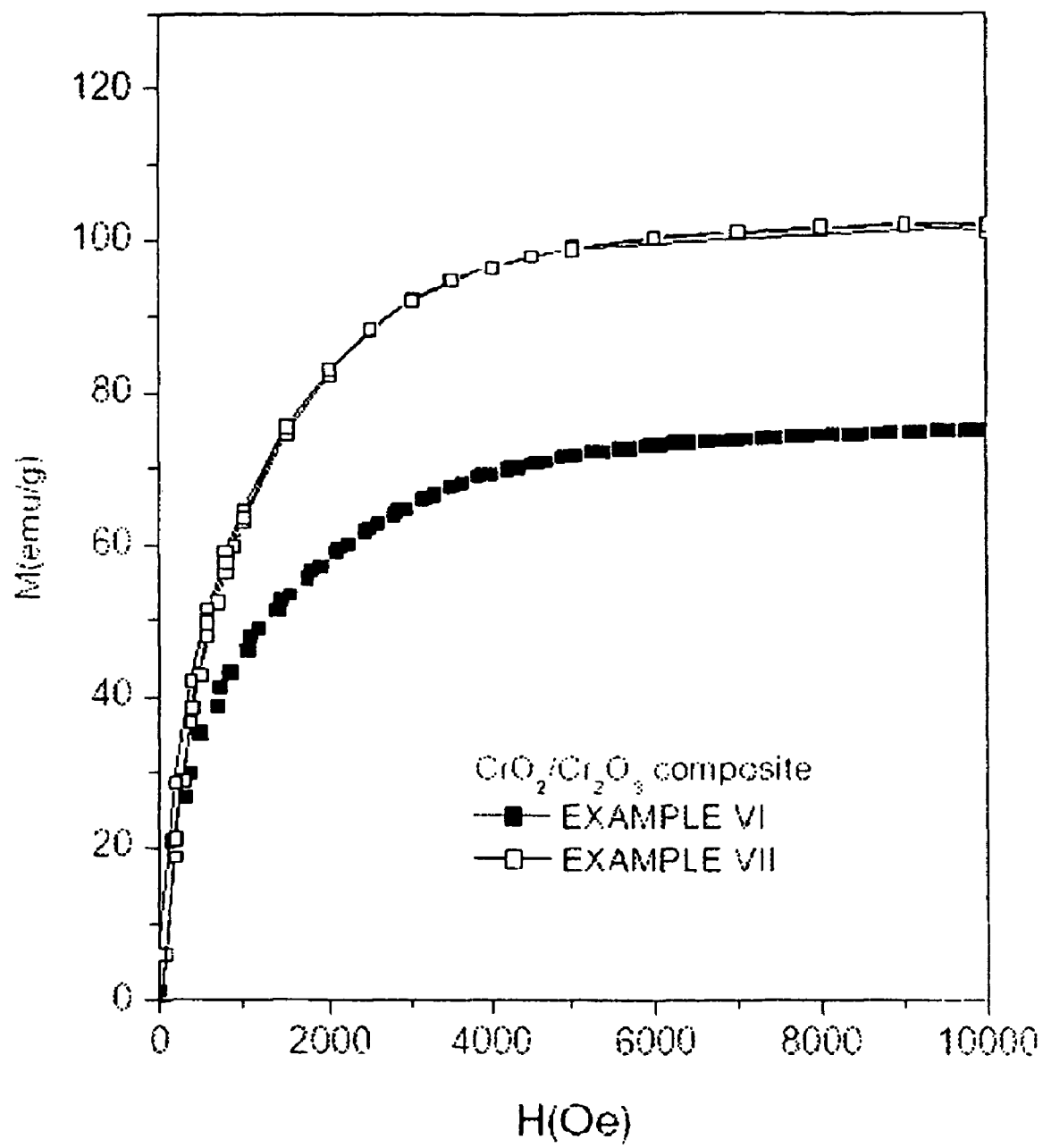

The product of Example V was examined for $M_s$ value, as in Example I. The $M_s$ value found to be 103 emu/gm at 5 K as is shown in FIG. 3b.

Figure 4D:
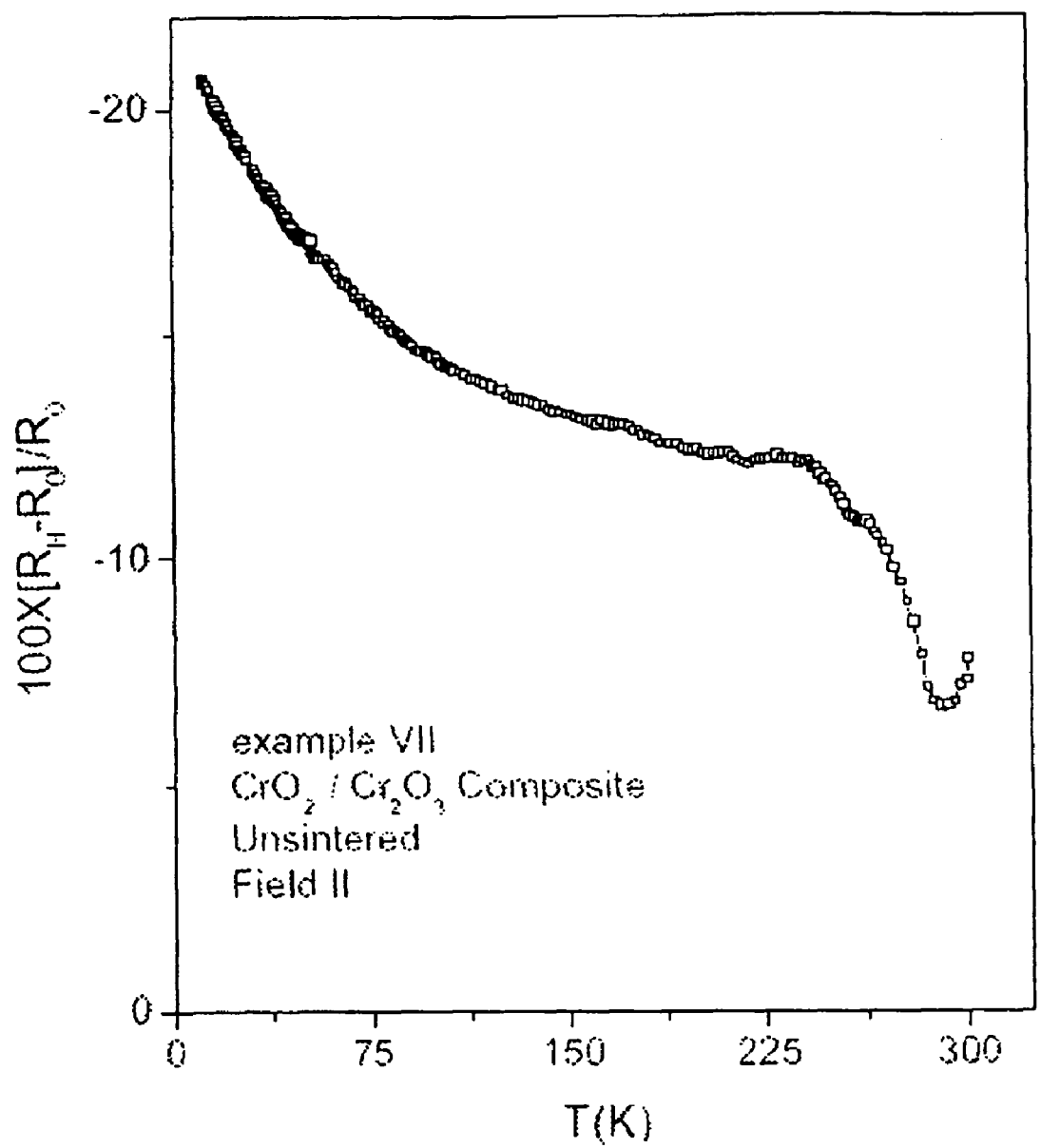
Figure 4C:
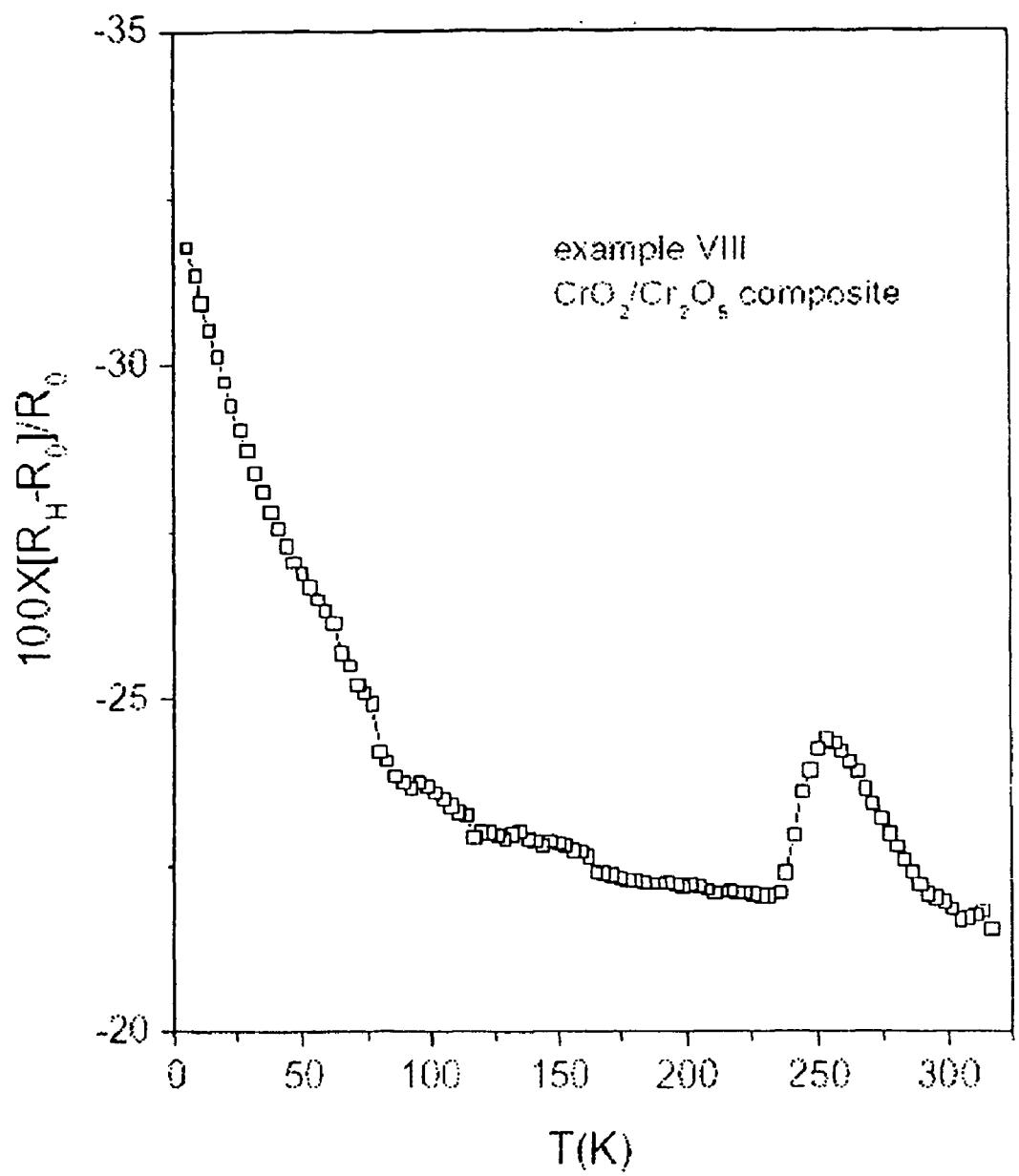
Figure 4I:
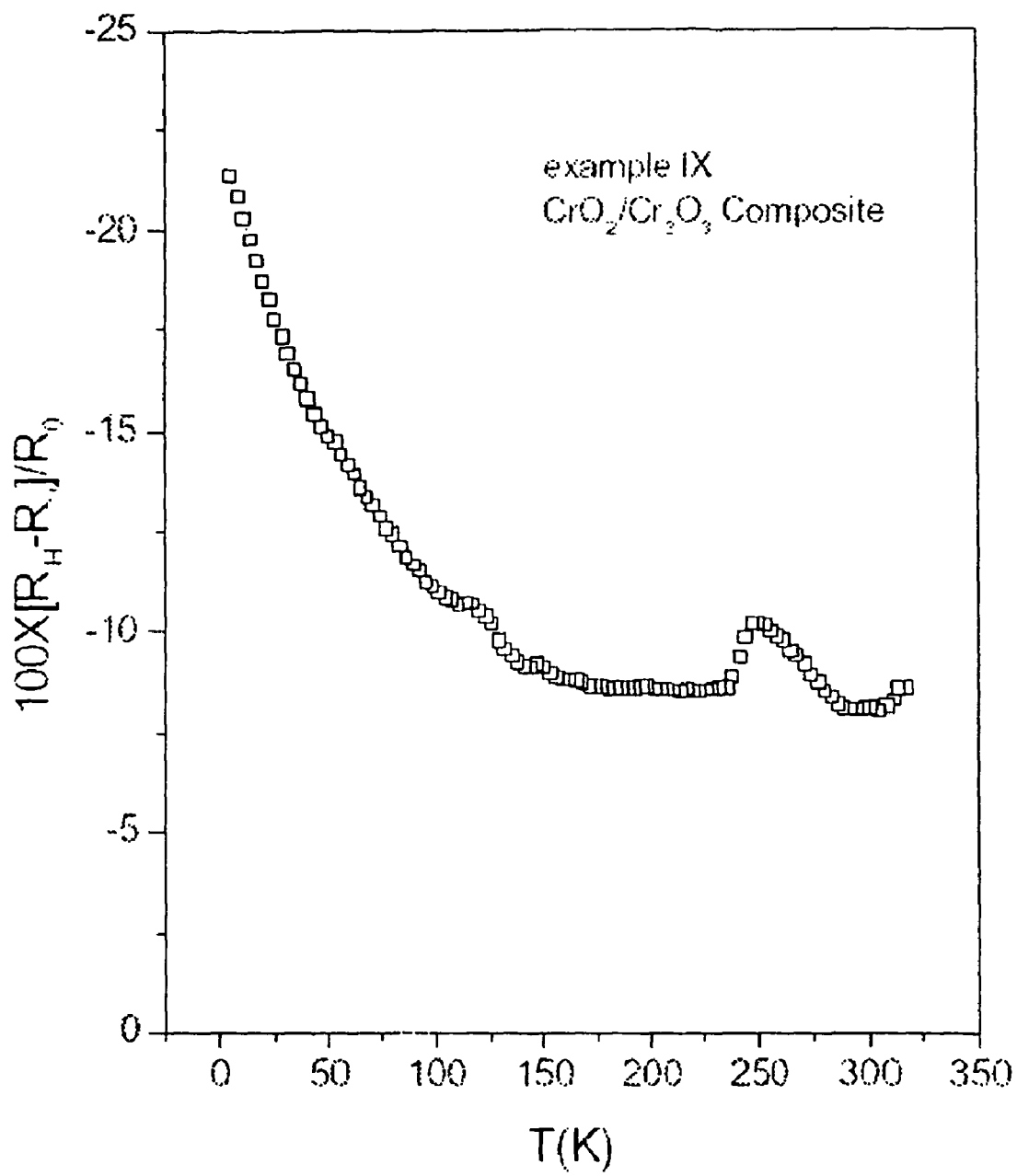

Magnetoresistance measurements were done on this sample in the temperature range 5K to 300 K in the magnetic fields of the order of 2T. Here the H was parallel to the direction of current i during the measurement. Results are shown in FIG. 4d. A significant negative MR of 8% was obtained near room temperature for this sample.

Example VIII

The procedure of Example IV was repeated, with the only change of precursor in the form of sintered pellet (1.5 g) was sealed in a glass tube which was kept in the oven maintained at temperature at around 385° C.

Figure 1H:
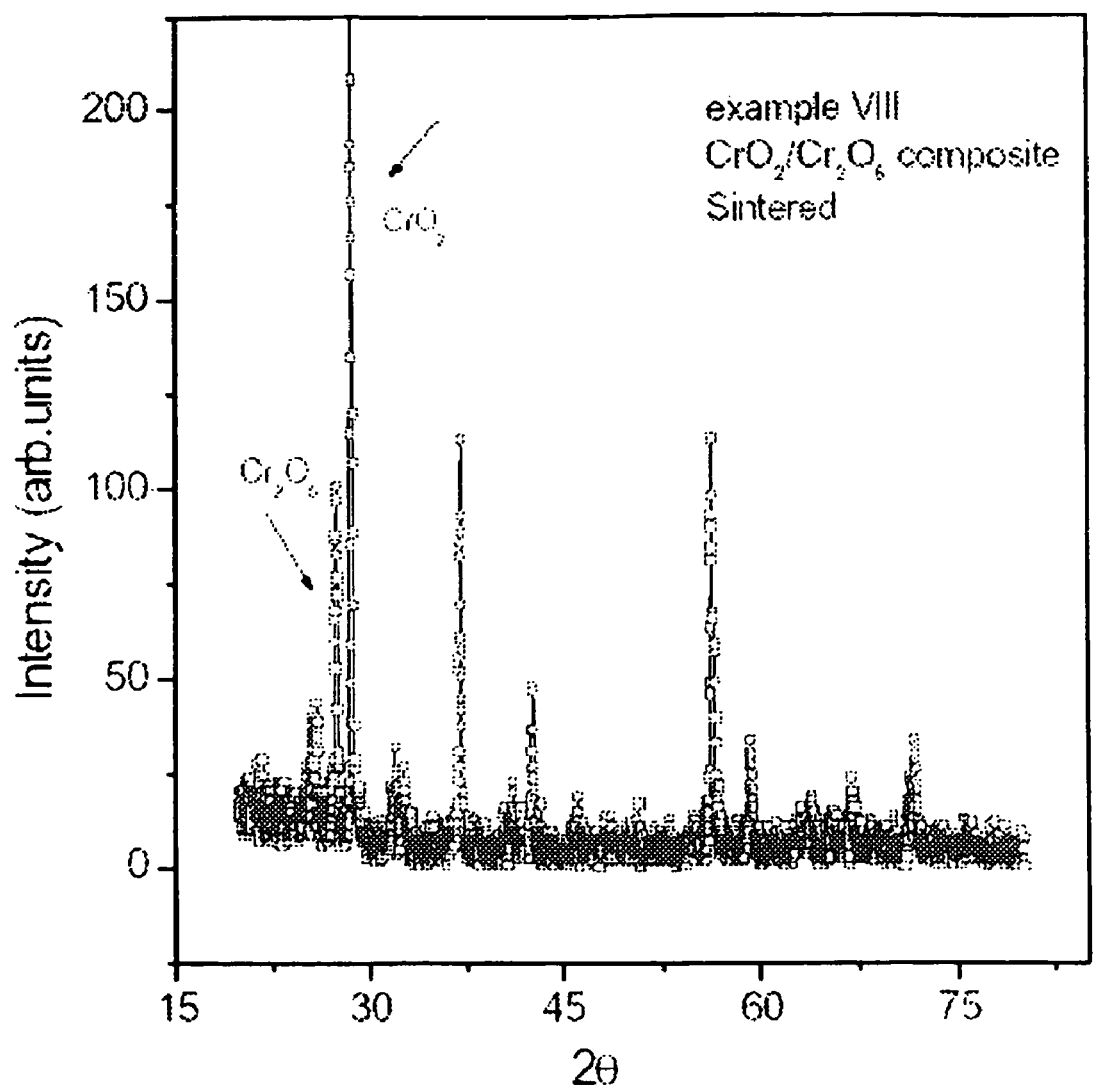

The X-ray diffraction examination was done as in Example I and the results are shown in FIG. 1(h). The product formed was found to be a composite of $CrO_2/Cr_2O_5$ from XRD.

Figure 3C:
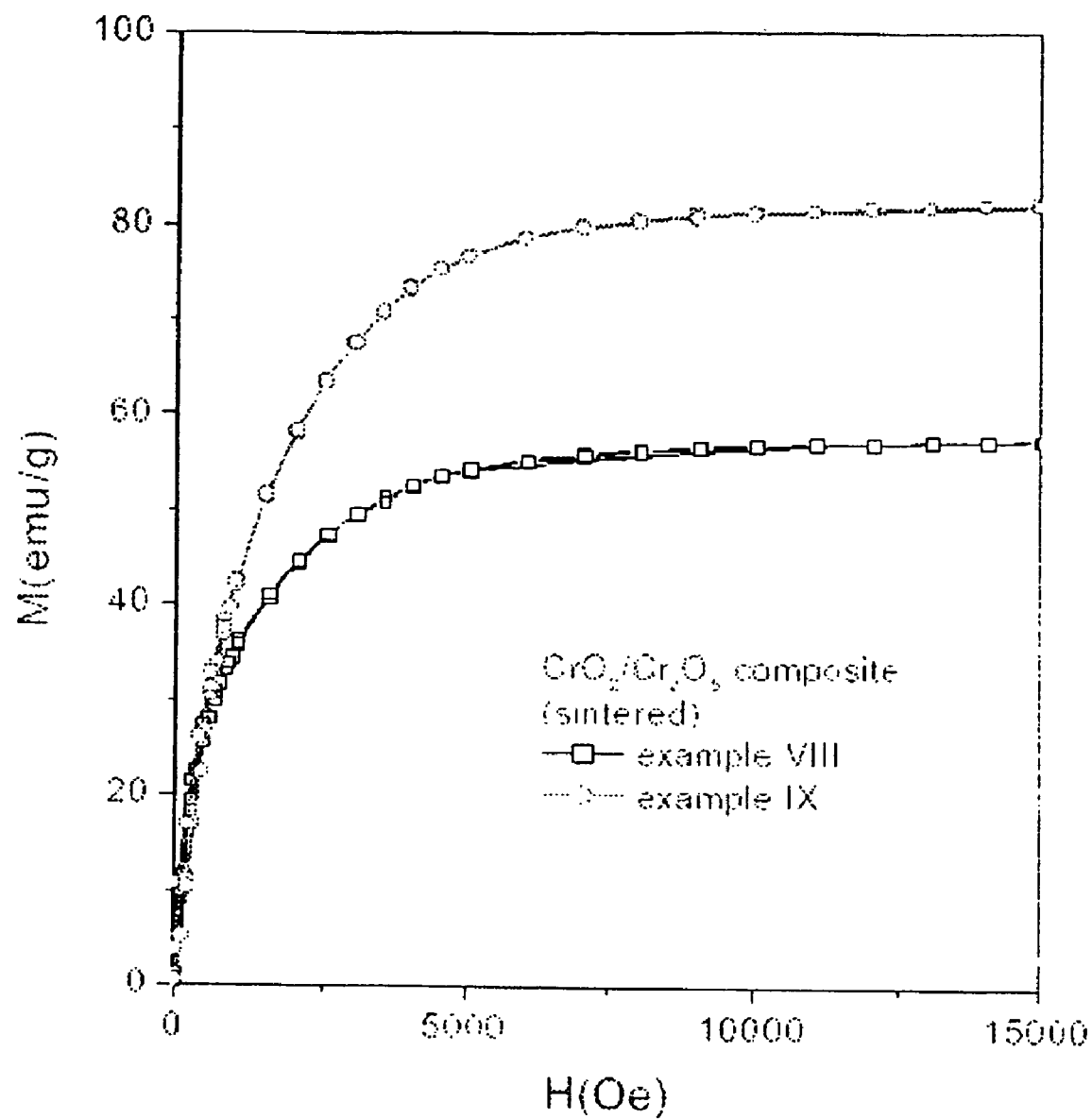

The product of Example VIII was examined for $M_s$ value, as in Example I. (See FIG. 3c). The $M_s$ value found to be around 60 emu/gm at 5 K.

Magnetoresistance measurements were conducted on this sample in the temperature range from 5 K to 300 K in the presence of magnetic fields of the order of 2 T (here H⊥i). Large negative MR defined as $(R_H-R_0)/R_0$ was obtained as shown in FIG. 4e. Significant negative MR of the order of 22% was obtained near room temperature as shown in FIG. 4e.

Example IX

The procedure of Example IV was repeated, with the only change of precursor in the form of sintered pellet (1 g) was sealed in a glass tube which was kept in the oven maintained at temperature at around 390° C.

Figure 1I:
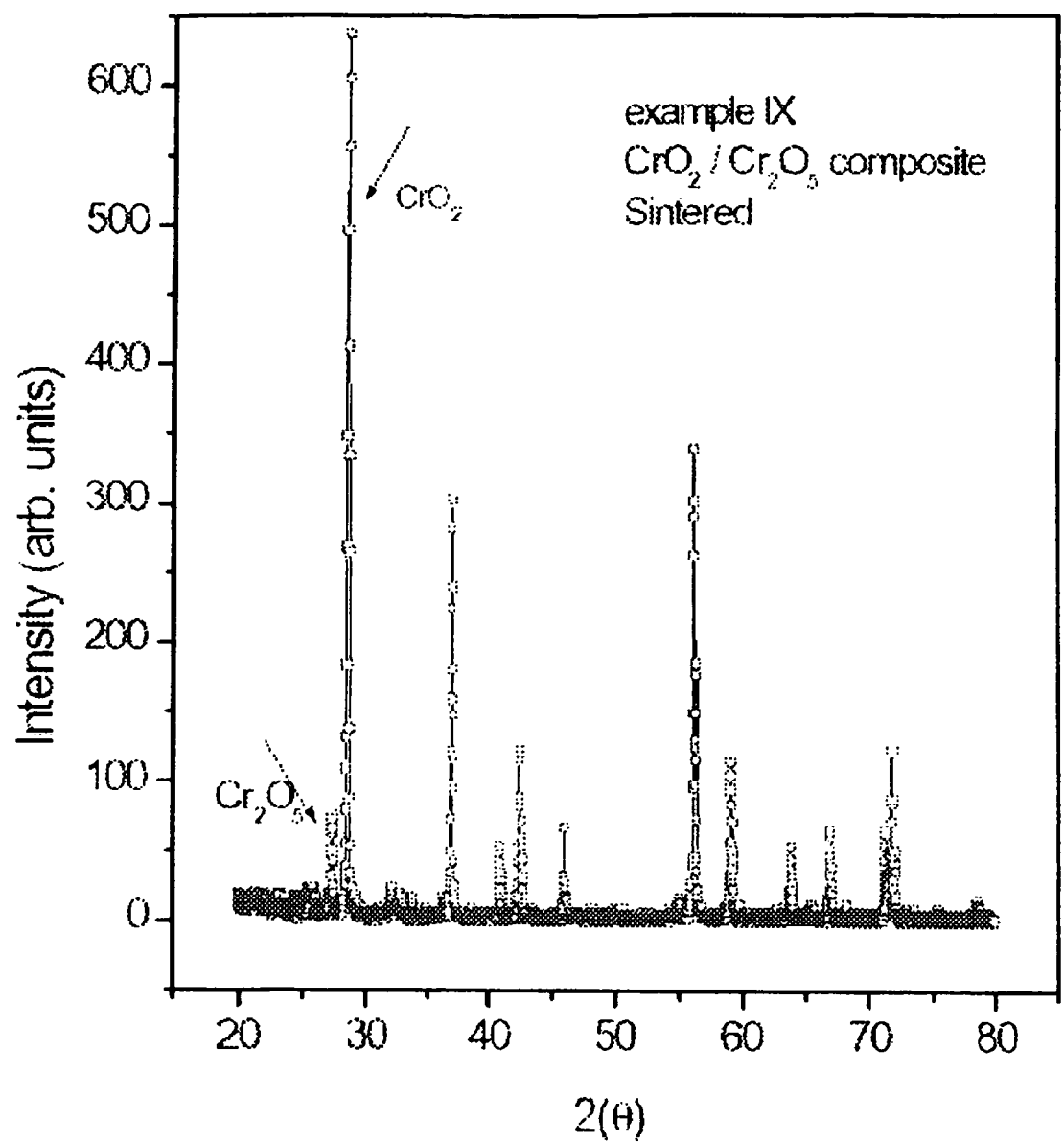

The X-ray diffraction examination was done as in Example I, and the results are shown in FIG. 1(i). The product formed was found to be a composite of $CrO_2/Cr_2O_5$ from XRD.

The product of Example IX was examined for $M_s$ value, as in Example I. (See FIG. 3c). The $M_s$ value found to be 80 emu/gm at 5 K.

Magnetoresistance measurements were conducted on this sample in the temperature range from 5 K to 300 K in the presence of magnetic fields of the order of 2 T (here H⊥i). Large negative MR defined as $(R_H-R_0)/R_0$ was obtained as shown in FIG. 4f. Negative MR of the order of 8% was obtained near room temperature as shown in FIG. 4f.

The saturation magnetization ($M_s$) and magnetoresistance (MR) measurements conducted on products of example I to example IX are summarized in table 3 and table 4.

TABLE 3

| $M_s$ Values at 5 K for polycrystalline samples of the present invention | |
|---|---|
| Unsintered $CrO_2$ example I, III | 132 to 135, emu/g |
| Sintered $CrO_2$ example IV, V | 126, 127 emu/g |
| $CrO_2/Cr_2O_3$ Sintered Composite Example VI | 75 emu/g |
| $CrO_2/Cr_2O_3$ Unsintered Composite Example VII | 103 emu/g |
| $CrO_2/Cr_2O_5$ Sintered Composite Example VIII | 60 emu/g |
| $CrO_2/Cr_2O_5$ Sintered Composite Example IX | 80 emu/g |

TABLE 4

| % Magnetoresistance $[100X(R_H - R_0)/R_0]$ at 5 k and 290 K. | | |
|---|---|---|
| Product | % Negative MR at 5 K | % Negative MR at 290 K |
| Example IV Sintered $CrO_2$ | 12%* | 5% |
| Example V Sintered $CrO_2$ | 21% | 2% |
| Example VI Sintered $CrO_2/Cr_2O_3$ composite | 25% | 33% |
| Example VII Cold Pressed $CrO_2/Cr_2O_3$ composite | 21% | 8% |
| Example VIII Sintered $CrO_2/Cr_2O_5$ composite | 31% | 22% |

TABLE 4-continued

% Magnetoresistance [100X($R_H - R_0$)/$R_0$] at 5 k and 290 K.

| Product | % Negative MR at 5 K | % Negative MR at 290 K |
|---|---|---|
| Example IX Sintered $CrO_2/Cr_2O_5$ composite | 21% | 8% |

*12% MR was found at 11 K.
*MR in Example IV and VII was measured using Oxford high field magnet and cryostat Here H was parallel to the direction of current using standard four probe technique. MR in rest of the samples was measured using PPMS where H is perpendicular to the current direction.

ADVANTAGE OF THE PRESENT INVENTION

The present invention provides high purity chromium dioxide ($CrO_2$) having saturation magnetization of 132-135 emu/gm which is much higher than known samples of $CrO_2$. Consequently, the pure $CrO_2$ of the present invention shows enhanced negative magnetoresistance at room temperature making it more useful as a magnetoresistive material in device applications.

The composites of the present invention exhibits enhanced negative magnetoresistance at low temperatures as well as near room temperature. They are obtainable in any ratio of their constituent compounds in sintered form. They are substantially homogenous. Because of their higher magnetoresistance near room temperature and substantial reproducibility, the composites of the present invention are very useful as magnetoresistive materials in device applications.

The process of present invention for manufacture of half metallic ferromagnet, high purity chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$),
does not need high-pressure equipment, is simple to operate and is cost effective;
gives a polycrystalline $CrO_2$ in bulk, having saturation magnetization value close to the theoretical value at a temperature of 5 K;
gives the final product in desired shape of fairly good hardness, required for all practical purposes such as for measuring electrical resistivity and making magnetoresistive sensor etc.; This product which is fairly hard in the final form may be useful as target in Pulsed Laser Deposition and other techniques for thin film deposition.
provides $CrO_2$ of substantially high purity suitable for spintronic devices.
the % negative MR is found to be significant at room temperature depicting the spin polarization is maintained at such elevated temperatures.
Provides composites in any desired ratio of the constituent compounds by a simple control of the temperature of heating the intermediate oxide.

The invention claimed is:

1. A substantially pure bulk chromium dioxide ($CrO_2$) having saturation magnetization of at least 120 emu/gm.

2. The substantially pure bulk chromium dioxide according to claim 1 having saturation magnetization of 126 emu/gm when synthesized in pellet form.

3. The substantially pure bulk chromium dioxide according to claim 1 having saturation magnetization of 132 to 135 emu/gm when synthesized in powder form.

4. The substantially pure bulk chromium dioxide according to claim 1, which is in polycrystalline form.

5. The substantially pure bulk chromium dioxide according to claim 4 having negative magnetoresistance of at least 2% at about room temperature at 2 Tesla.

6. The substantially pure bulk chromium dioxide according to claim 1 having negative magnetoresistance of at least 0.5% at about room temperature at 2 Tesla.

7. The substantially pure bulk chromium dioxide according to claim 6 having negative magnetoresistance of at least 2% at about room temperature at 2 Tesla.

8. The substantially pure bulk chromium dioxide according to claim 7 having negative magnetoresistance of about 5% at about room temperature at 2 Tesla.

9. The substantially pure bulk chromium dioxide according to claim 1, wherein said bulk $CrO_2$ comprises sintered pellets.

10. Bulk composites of chromium dioxide and chromium sesquioxide ($CrO_2/Cr_2O_3$) having negative magnetoresistance of at least 0.5% at about room temperature at 2 Tesla.

11. The bulk composites according to claim 10, having negative magnetoresistance of at least 2% at about room temperature at 2 Tesla.

12. The bulk composites according to claim 11, having negative magnetoresistance of at least 5% at about room temperature at 2 Tesla.

13. The bulk composites according to claim 12, having negative magnetoresistance of 8% at about room temperature at 2 Tesla for a 25% molar $Cr_2O_3$ composite, which is cold pressed.

14. The bulk composites according to claim 12, having negative magnetoresistance of 33% at about room temperature at 2 Tesla for a 40% molar $Cr_2O_3$ composite, which is sintered.

15. The bulk composites according to claim 10, having saturation magnetization of 75 emu/gm at 5K for a sintered 40% molar $Cr_2O_3$ composite.

16. The bulk composites according to claim 10, having saturation magnetization of 103 emu/gm at 5K for a cold pressed composite of 25% molar $Cr_2O_3$.

17. The bulk composites according to claim 10, which can be obtained in powder form and in pellet form.

18. The bulk composites according to claim 10, which is homogenous.

19. The bulk composites according to claim 10, which is obtainable in any ratio of the constituent compounds.

20. The bulk composites according to claim 10, which has substantial reproducibility in sintered form.

21. Bulk composites of chromium dioxide and $Cr_2O_5$ ($CrO_2/Cr_2O_5$) having negative magnetoresistance of at least 0.5% at about room temperature at 2 Tesla.

22. The bulk composites according to claim 21, having negative magnetoresistance of at least 2% at about room temperature at 2 Tesla.

23. The bulk composites according to claim 22, having negative magnetoresistance of at least 5% at about room temperature at 2 Tesla.

24. The bulk composites according to claim 23, having negative magnetoresistance of about 8% at 2T at about room temperature for a sintered composite with 80 emu/g $M_s$.

25. The bulk composites according to claim 23, having negative magnetoresistance of about 22% at 2T at about room temperature for a sintered composite with 60 emu/g $M_s$.

26. The bulk composites according to claim 21, which can be obtained in powder form and in pellet form.

27. The bulk composites according to claim 21, which is homogenous.

28. The bulk composites according to claim 21, which is obtainable in any ratio of the constituent compounds.

29. The bulk composites according to claim 21, which has substantial reproducibility in sintered form.

30. A process for manufacture of substantially pure bulk chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) comprising heating an intermediate oxide, primarily $Cr_8O_{21}$, from about room temperature to a temperature of between 350 and 500° C. for a period of between 1-5 hours whereby substantially pure chromium dioxide ($CrO_2$), or composites of chromium dioxide or chromium sesquioxide ($CrO_2/Cr_2O_3$) or composites of chromium dioxide and $Cr_2O_5$ ($CrO_2/Cr_2O_5$) are formed.

31. The process according to claim 30, wherein intermediate oxide is converted to said substantially pure chromium dioxide $CrO_2$ when the temperature is maintained between 390-400° C. or to a composite of chromium dioxide and chromium sesquioxide ($CrO_2/Cr_2O_3$) when the temperature is maintained between 400-500° C. or to a composite of chromium dioxide and $Cr_2O_5$ ($CrO_2/Cr_2O_5$) when the temperature is maintained between 350-390° C.

32. The process according to claim 30, wherein intermediate oxide, primarily $Cr_8O_{21}$ used in the process of the invention is prepared by heating $CrO_3$ and maintaining the temperature in the range of 230-320° C.

33. The process according to claim 32, wherein in the composites of $CrO_2/Cr_2O_3$ and $CrO_2/Cr_2O_5$, the mass fraction of $Cr_2O_3$ or $Cr_2O_5$ can be systematically varied by varying the temperature between 350 and 500° C.

34. The process according to claim 30, wherein said $CrO_3$ is heated and maintained in the said temperature range for 6-14 hours.

35. The process according to claim 34, wherein $CrO_3$ is heated in dry oxygen/air.

36. The process according to claim 34, wherein $CrO_3$ is heated at about atmospheric pressure.

37. The process according claim 34, wherein $CrO_3$ is heated to raise the temperature to about 250° C. and then maintained in the said temperature range.

38. The process according to claim 30, wherein intermediate oxide thus formed is cooled to about room temperature at the same rate as it was heated.

39. The process according to claim 30, wherein the intermediate oxide is crushed into powder form prior to heating.

40. The process according to claim 30, wherein, prior to heating, the intermediate oxide in powder form is sealed in an inert tube or can be pelletized and sintered before sealing in an inert tube.

41. The process according to claim 30, wherein the temperature of intermediate oxide is maintained in the temperature range between 350 and 500° C. for 2-3 hrs.

42. The process according to claim 30, wherein intermediate oxide, primarily $Cr_8O_{21}$ used in the process of the invention is prepared by heating $CrO_3$ and maintaining the temperature in the range of 250-280° C.

43. The process according to claim 30, wherein said $CrO_3$ is heated and maintained in the said temperature range for 8-12 hours.

44. A substantially pure bulk chromium dioxide ($CrO_2$) manufactured by a process for manufacture of substantially pure chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) comprising heating an intermediate oxide, primarily $Cr_8O_{21}$ from about room temperature to a temperature of between 350 and 500° C. for a period of between 1-5 hours whereby substantially pure chromium dioxide ($CrO_2$), or composites of chromium dioxide or chromium sesquioxide ($CrO_2/Cr_2O_3$) or composites of chromium dioxide and $Cr_2O_5$ ($CrO_2/Cr_2O_5$) are formed.

45. Bulk composites of chromium dioxide and chromium sesquioxide ($CrO_2/Cr_2O_3$) manufactured by a process for manufacture of substantially pure chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) comprising heating an intermediate oxide, primarily $Cr_8O_{21}$ from about room temperature to a temperature of between 350 and 500° C. for a period of between 1-5 hours whereby substantially pure chromium dioxide ($CrO_2$), or composites of chromium dioxide or chromium sesquioxide ($CrO_2/Cr_2O_3$) or composites of chromium dioxide and $Cr_2O_5$ ($CrO_2/Cr_2O_5$) are formed.

46. Bulk composites of chromium dioxide and $CrO_5$ ($CrO_2/Cr_2O_5$) manufactured by a process for manufacture of substantially pure chromium dioxide ($CrO_2$), or composites of chromium dioxide and chromium sesquioxide ($CrO_2/Cr_2O_3$) or composites of chromium dioxide and $Cr_2O_5$ ($CrO_2/Cr_2O_5$) comprising heating an intermediate oxide, primarily $Cr_8O_{21}$ from about room temperature to a temperature of between 350 and 500° C. for a period of between 1-5 hours whereby substantially pure chromium dioxide ($CrO_2$), or composites of chromium dioxide or chromium sesquioxide ($CrO_2/Cr_2O_3$) or composites of chromium dioxide and $Cr_2O_5$ ($CrO_2/Cr_2O_5$) are formed.

* * * * *